(12) United States Patent
Chen et al.

(10) Patent No.: US 9,585,167 B2
(45) Date of Patent: Feb. 28, 2017

(54) DEVICE TO DEVICE USER EQUIPMENT AND BASE STATION

(71) Applicant: Institute For Information Industry, Taipei (TW)

(72) Inventors: Chiu-Wen Chen, Taipei (TW); Chia-Hung Wei, Taipei (TW)

(73) Assignee: Institute For Information Industry, Taipei (TW)

( * ) Notice: Subject to any disclaimer, the term of this patent is extended or adjusted under 35 U.S.C. 154(b) by 214 days.

(21) Appl. No.: 14/497,547

(22) Filed: Sep. 26, 2014

(65) Prior Publication Data
US 2015/0092706 A1    Apr. 2, 2015

Related U.S. Application Data

(60) Provisional application No. 61/883,989, filed on Sep. 28, 2013.

(51) Int. Cl.
*H04W 74/02* (2009.01)
*H04W 72/04* (2009.01)
(Continued)

(52) U.S. Cl.
CPC ............. *H04W 74/02* (2013.01); *H04W 72/04* (2013.01); *H04W 76/023* (2013.01); *H04W 52/0209* (2013.01); *H04W 72/042* (2013.01)

(58) Field of Classification Search
CPC ..... H04W 74/02; H04W 76/023; H04W 72/04
See application file for complete search history.

(56) References Cited

U.S. PATENT DOCUMENTS

| 9,084,241 B2* | 7/2015 | Madan | H04W 72/0406 |
| 2010/0144323 A1* | 6/2010 | Collins | G06Q 10/10 455/414.1 |

(Continued)

FOREIGN PATENT DOCUMENTS

| WO | 2011088619 A1 | 7/2011 |
| WO | 2013075340 A1 | 5/2013 |

(Continued)

OTHER PUBLICATIONS

Extended European search report (EESR) for the European counterpart patent application to the present U.S. Application, rendered by European Patent Office on Feb. 13, 2015, 8 pages.

(Continued)

*Primary Examiner* — Mohamed Kamara
*Assistant Examiner* — Thad Defauw
(74) *Attorney, Agent, or Firm* — Skaar Ulbrich Macari, P.A.

(57) ABSTRACT

A device to device (D2D) user equipment and a base station are provided. The D2D user equipment includes a transceiver and a processor. The transceiver receives a wireless signal having a hybrid access channel carrying a D2D hybrid access map. The processor is electrically connected to the transceiver retrieves the D2D hybrid access map from the hybrid access channel. The D2D hybrid access map indicates a D2D resource block. A first D2D user equipment transmits a D2D hybrid access request to a second D2D user equipment via the D2D resource block and the second D2D user equipment transmits a D2D hybrid access response to the first D2D user equipment via the D2D resource block. Accordingly, the first D2D user equipment and the second D2D user equipment perform D2D data transmission according to the D2D data transmission information carried in the D2D hybrid access response.

22 Claims, 24 Drawing Sheets

(51) Int. Cl.
*H04W 76/02* (2009.01)
*H04W 52/02* (2009.01)

(56) References Cited

U.S. PATENT DOCUMENTS

| | | |
|---|---|---|
| 2011/0103317 A1 | 5/2011 | Ribeiro |
| 2012/0163252 A1* | 6/2012 | Ahn .................... H04L 1/0003 370/280 |
| 2012/0300662 A1* | 11/2012 | Wang ................... H04W 72/02 370/252 |
| 2013/0029675 A1 | 1/2013 | Kwon et al. |
| 2013/0107851 A1 | 5/2013 | Park et al. |
| 2013/0150061 A1* | 6/2013 | Shin .................... H04W 4/005 455/450 |
| 2014/0036876 A1* | 2/2014 | Li ....................... H04W 24/04 370/336 |
| 2016/0242144 A1* | 8/2016 | Adachi ................ H04W 72/04 |

FOREIGN PATENT DOCUMENTS

| | | |
|---|---|---|
| WO | 2013108219 A1 | 7/2013 |
| WO | 2013141546 A1 | 9/2013 |

OTHER PUBLICATIONS

Office Action to the corresponding Taiwan Patent Application No. 103132912 rendered by the Taiwan Intellectual Property Office (TIPO) on Nov. 24, 2015, 13 pages (including English translation).

\* cited by examiner

DEVICE TO DEVICE USER EQUIPMENT AND BASE STATION

PRIORITY

This application claims the benefit of priority based on U.S. Provisional Application Ser. No. 61/883,989 filed on Sep. 28, 2013, which is hereby incorporated herein by reference in its entirety.

FIELD

The present invention relates to a device to device (D2D) user equipment (UE) and a base station. More specifically, the base station of the present invention generates a D2D hybrid access map which comprises configuration information about the allocated resource blocks necessary for D2D UEs to transmit data therebetween so that the D2D UEs can use the allocated resource blocks to perform the D2D data transmission.

BACKGROUND

In recent years, as the wireless communication technologies become matured, a lot of wireless network systems have been derived and put into use in various circumstances. In the public safety network architecture, emergency communication services (e.g., calling the police, the fire station, or the ambulance) or inter-group communication services shall be provided, so there is a need for direct communication between adjacent UEs to make the communication therebetween more efficient. However, the direct communication must be accomplished through specific UEs and a specific frequency band.

Currently, the $3^{rd}$ Generation Partnership Project Long Term Evolution (3GPP LTE) network is experiencing the rapidest development and UEs adopting the 3GPP LTE network are widely used in daily communications. In the 3GPP LTE network, data transmissions between the UEs must be performed by using a base station and a core network as intermediates, so the data transmission must be done within the signal coverage of the base station and via the allocated resources. A UE not located within the signal coverage of the base station is unable to get a resource allocation and, therefore, is unable to communicate with other UEs. Additionally, the current 3GPP LTE network does not provide the service of direct communication between UEs, so the UEs of the current 3GPP LTE network cannot be applied in the public safety network.

Accordingly, an urgent need exists in the art to provide a device to device (D2D) transmission mechanism capable of modifying the current 3GPP LTE network to extend the application thereof to the public safety network so that direct communications between the UEs can be achieved without affecting signal transmissions of the original 3GPP LTE network.

SUMMARY

An objective of the present invention includes providing a device to device (D2D) user equipment (UE) and a base station. The D2D UE of the present invention not only is compatible with the current 3GPP LTE network, but also can directly communicate with other D2D UEs. The base station allocates specific D2D resource blocks for use by the D2D UEs to create a D2D hybrid access map which is then loaded into a specific hybrid access channel of a wireless signal. In this way, the D2D UEs can be informed of the resource blocks that can be used in the direct communication according to the D2D hybrid access map. Accordingly, the present invention can allocate resource blocks efficiently for use by the D2D UEs and general UEs in the current 3GPP LTE network, and this allows the 3GPP LTE network to be extended to the public safety network.

To achieve the aforesaid objective, certain embodiments of the present invention include a device to device (D2D) UE. The D2D UE comprises a transceiver and a processor. The transceiver is configured to receive a wireless signal. The wireless signal has a hybrid access channel carrying a D2D hybrid access map, and the D2D hybrid access map is generated by a base station. The processor is electrically connected to the transceiver, and is configured to retrieve the D2D hybrid access map from the hybrid access channel. The D2D hybrid access map indicates a D2D resource block so that a first D2D UE transmits a D2D hybrid access request to a second D2D UE via the D2D resource block, and the second D2D UE transmits a D2D hybrid access response to the first D2D UE via the D2D resource block after receiving the D2D hybrid access request. Accordingly, the first D2D UE and the second D2D UE perform a D2D data transmission according to a piece of D2D data transmission information carried in the D2D hybrid access response.

In order to achieve the aforesaid objective, certain embodiments of the present invention include a base station. The base station comprises a processor and a transceiver. The processor is configured to generate a wireless signal. The wireless signal has a hybrid access channel carrying a D2D hybrid access map. The transceiver is electrically connected to the processor, and is configured to transmit the wireless signal to at least one D2D UE. The D2D hybrid access map indicates a D2D resource block so that a first D2D UE transmits a D2D hybrid access request to a second D2D UE via the D2D resource block, and the second D2D UE transmits a D2D hybrid access response to the first D2D UE via the D2D resource block after receiving the D2D hybrid access request. Accordingly, the first D2D UE and the second D2D UE perform a D2D data transmission according to a piece of D2D data transmission information carried in the D2D hybrid access response.

The detailed technology and preferred embodiments implemented for the subject invention are described in the following paragraphs accompanying the appended drawings for people skilled in this field to well appreciate the features of the claimed invention.

DETAILED DESCRIPTION

Hereinbelow, the present invention will be explained with reference to example embodiments thereof. The present invention includes a device to device (D2D) UE and a base station. It should be appreciated that, these example embodiments are not intended to limit the present invention to any specific examples, embodiments, environment, applications or implementations as described in these example embodiments. Therefore, description of these example embodiments is only for purpose of illustration rather than to limit the present invention, and the scope of this application shall be governed by the claims.

In the following embodiments and drawings, elements not directly related to the present invention are omitted from depiction; and dimensional relationships among individual elements in the following drawings are illustrated only for ease of understanding but not to limit the actual scale.

The base station, UE and communication methods thereof provided in the present invention are related to the device to device communication of the wireless network system. The wireless network system referred to in the present invention may be a wireless network system that conforms to the Long Term Evolution technology or some other wireless network system adopting, for example, the orthogonal frequency division multiplexing (OFDM).

Figure 1:
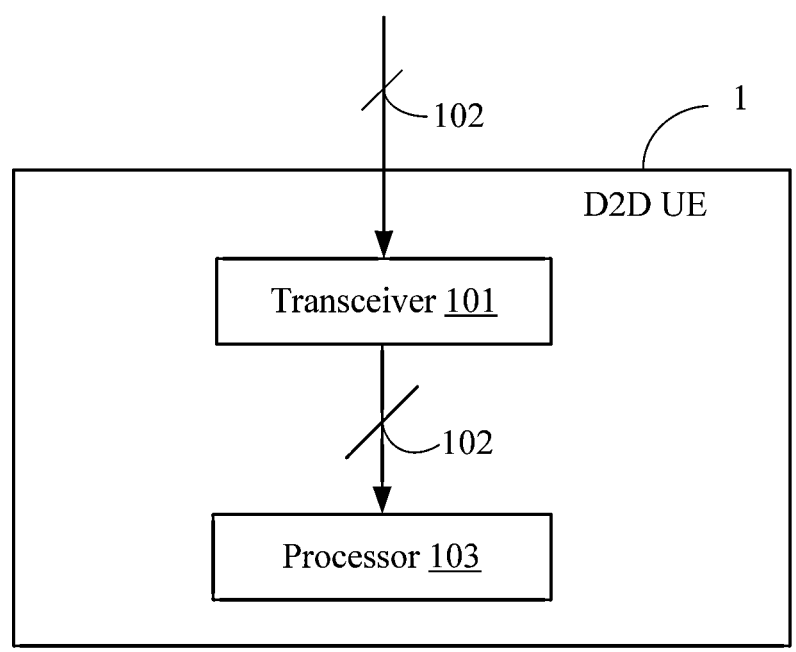
FIG. 1 is a schematic view illustrating a user equipment 1 according to the present invention.
Figure 2:
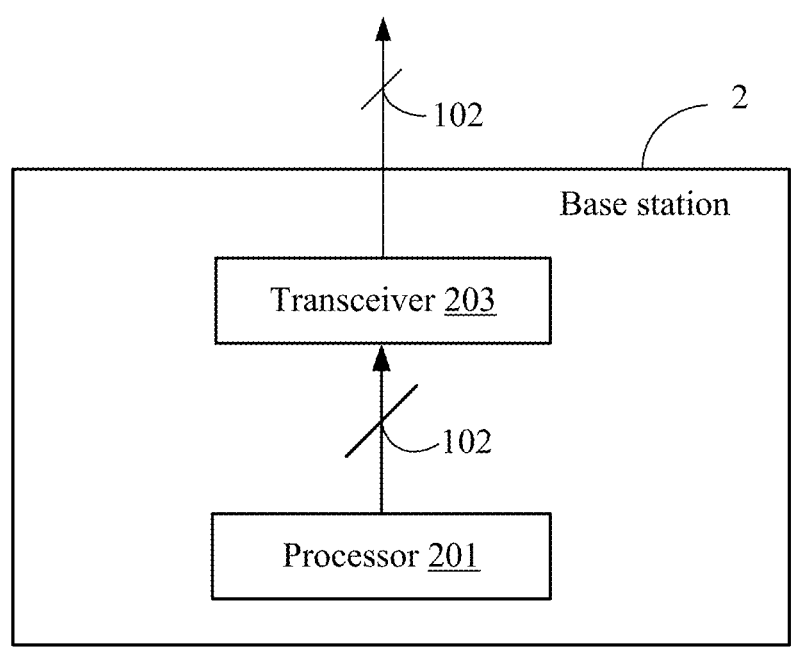
FIG. 2 is a schematic view illustrating a base station 2 according to the present invention.

A first embodiment of the present invention is shown in FIG. 1, FIG. 2 and FIGS. 3A-3B. FIG. 1 is a schematic view illustrating a device to device (D2D) UE 1 according to the present invention. The D2D UE 1 comprises a transceiver 101 and a processor 103. The transceiver 101 is configured to receive a wireless signal 102. The wireless signal 102 has a hybrid access channel. The processor 103 is electrically connected to the transceiver 101, and is configured to retrieve a D2D hybrid access map from the hybrid access channel. FIG. 2 is a schematic view illustrating a base station 2 according to the present invention. The base station 2 comprises a processor 201 and a transceiver 203. The processor 201 generates the wireless signal 102. The transceiver 203 is electrically connected to the processor 201, and is configured to transmit the wireless signal 102 to one or more D2D UEs (e.g., the D2D UE 1).

Figure 3A:
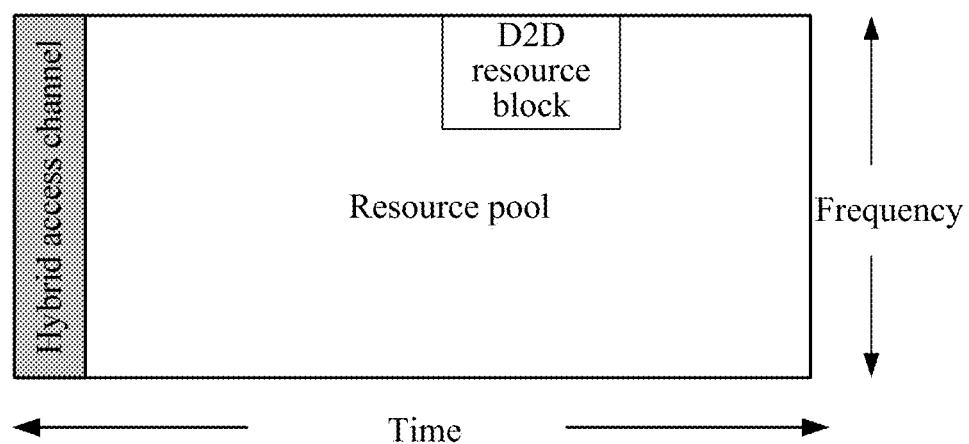
FIG. 3A is a schematic view illustrating allocation of resource blocks according to the present invention.

In the present invention, the hybrid access channel is a part of the radio resources of the current 3GPP LTE network, as shown in FIG. 3A. In other words, the present invention uses a part of the radio resources of the current 3GPP LTE network as the hybrid access channel to transmit configuration information for D2D data transmission. The hybrid access channel may be a fixed resource block, or be chosen from the radio resources by the base station when it begins to operate and then, along with the system configuration information, broadcasted to the D2D UEs located in the signal coverage of the base station. The hybrid access channel may be a part of the uplink radio resources, a part of the downlink radio resources or a combination thereof. Additionally, in the present invention, the other radio resources than the hybrid access channel are referred to as a resource pool, and the resource pool is used by the UEs of the current 3GPP LTE network and the D2D UE 1 of the present invention in communication.

Specifically, the base station 2 may choose a resource block (referred to as a D2D resource block hereinbelow) from the resource pool of the current 3GPP LTE architecture and then allocate it to the D2D UEs for use. Similarly, the D2D resource block may be a part of the uplink radio resources, a part of the downlink radio resources or a combination thereof. Additionally, in other embodiments, the base station 2 may also use radio resources (not shown) outside the current 3GPP LTE network architecture as the D2D resource block for use by the D2D UEs to transmit data. It should be appreciated that, FIG. 3A is only provided for purpose of illustration rather than to limit the present invention; and because those of ordinary skill in the art can readily understand that the base station 2 can choose one or more D2D resource blocks from the resource pool for use by the D2D UEs according to the practical demand in D2D communication, this will not be further described herein.

Next, based on the allocated D2D resource block, the base station 2 generates a device to device hybrid access map (D2D hybrid access map) to indicate the D2D resource block. Then, the base station 2 loads the D2D hybrid access map into the hybrid access channel of the wireless signal 102, and transmits the wireless signal 102 through broadcasting or multicasting. Then, a first D2D UE 11 and a second D2D UE 13 that are to perform the D2D data transmission can use the D2D resource blocks to perform the D2D data transmission after receiving the wireless signal 102.

Figure 3B:
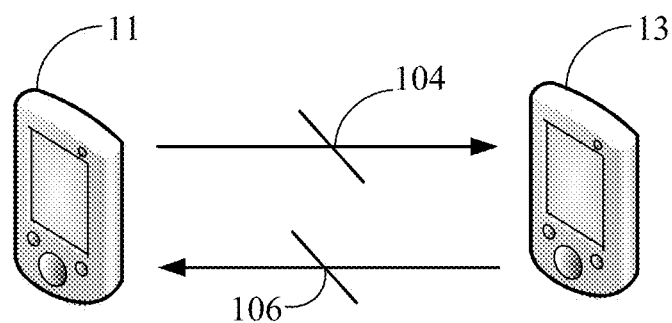
FIG. 3B is a schematic view illustrating a D2D handshake procedure according to the present invention.

FIG. 3B depicts a D2D handshake procedure. The first D2D UE 11 transmits a D2D hybrid access request 104 to the second D2D UE 13 via the D2D resource block. For example, the D2D hybrid access request 104 may be a pre-defined preamble, which may correspond to a user identification (ID) and a piece of resource request information. Additionally, the D2D hybrid access request 104 may also be a pre-authorized passkey. It should be appreciated that, the D2D UEs that are to perform the D2D data transmission may firstly negotiate the pre-defined preamble or the pre-authorized passkey via the hybrid access channel before the D2D handshake procedure is performed. Accordingly, the second D2D UE 13 can acquire the user ID of the first D2D UE 11 and a resource size necessary for the D2D data transmission according to the D2D hybrid access request 104.

Then, the second D2D UE 13 transmits a D2D hybrid access response 106 to the first D2D UE 11 via the D2D resource block after receiving the D2D hybrid access request 104. The D2D hybrid access response 106 comprises a piece of D2D data transmission information, which indicates a resource index (i.e., a starting position of sub-resource blocks in the D2D resource block) transmitted bidirectionally between the first D2D UE 11 and the second D2D UE 13. Accordingly, the first D2D UE 11 and the second D2D UE 13 can perform the D2D data transmission according to the D2D data transmission information carried in the D2D hybrid access response 106.

In an exemplary embodiment, the D2D UE 1 may be the first D2D UE 11. In this case, the processor 103 further generates the D2D hybrid access request 104, and the transceiver 101 further transmits the D2D hybrid access request 104 and receives the D2D hybrid access response 106. In another exemplary embodiment, the UE 1 may be the second D2D UE 13. In this case, the processor 103 further generates the D2D hybrid access response 106, and the transceiver 101 further receives the D2D hybrid access request 104 and transmits the D2D hybrid access response 106 to the first D2D UE 11.

Additionally, in other embodiments, the second D2D UE 13 may adjust a transmission power of the D2D hybrid access response 106 according to the received signal strength of the D2D hybrid access request 104. Specifically, when the signal strength of the D2D hybrid access request 104 received by the second D2D UE 13 is lower than a threshold value, it means that the quality of communication between the first D2D UE 11 and the second D2D UE 13 is poor, so the second D2D UE 13 can increase the transmission power of the D2D hybrid access response 106. On the contrary, when the signal strength of the D2D hybrid access request 104 received by the second D2D UE 13 is higher than the threshold value, it means that the quality of the communication between the first D2D UE 11 and the second D2D UE 13 is good, so the second D2D UE 13 can further adjust the transmission power of the D2D hybrid access response 106, which is to be transmitted to the first D2D UE 11, to a proper level, thereby reducing the power consumption of the second D2D UE 13 and the signal interference to other UEs.

In another embodiment, the D2D hybrid access response 106 may further carry a power control message. The second D2D UE 13 can generate the power control message according to the received signal strength of the D2D hybrid access request 104 received and then load the power control message into the D2D hybrid access response 106 to indicate the transmission power necessary for the first D2D UE 11 to perform the D2D data transmission. Specifically, when the signal strength of the D2D hybrid access request 104 received by the second D2D UE 13 is lower than the threshold value, it means that the quality of communication between the first D2D UE 11 and the second D2D UE 13 is poor, and in this case, the power control message can instruct the first D2D UE 11 to transmit data with a larger transmission power. On the contrary, when the signal strength of the D2D hybrid access request 104 received by the second D2D UE 13 is higher than the threshold value, it indicates that the quality of communication between the first D2D UE 11 and the second D2D UE 13 is good, and in this case, the power control message instructs the first D2D UE 11 to adjust the transmission power of the data transmission to a proper level so as to reduce the signal interference to other UEs and also reduce the power consumption of the first D2D UE 11.

Figure 4A:
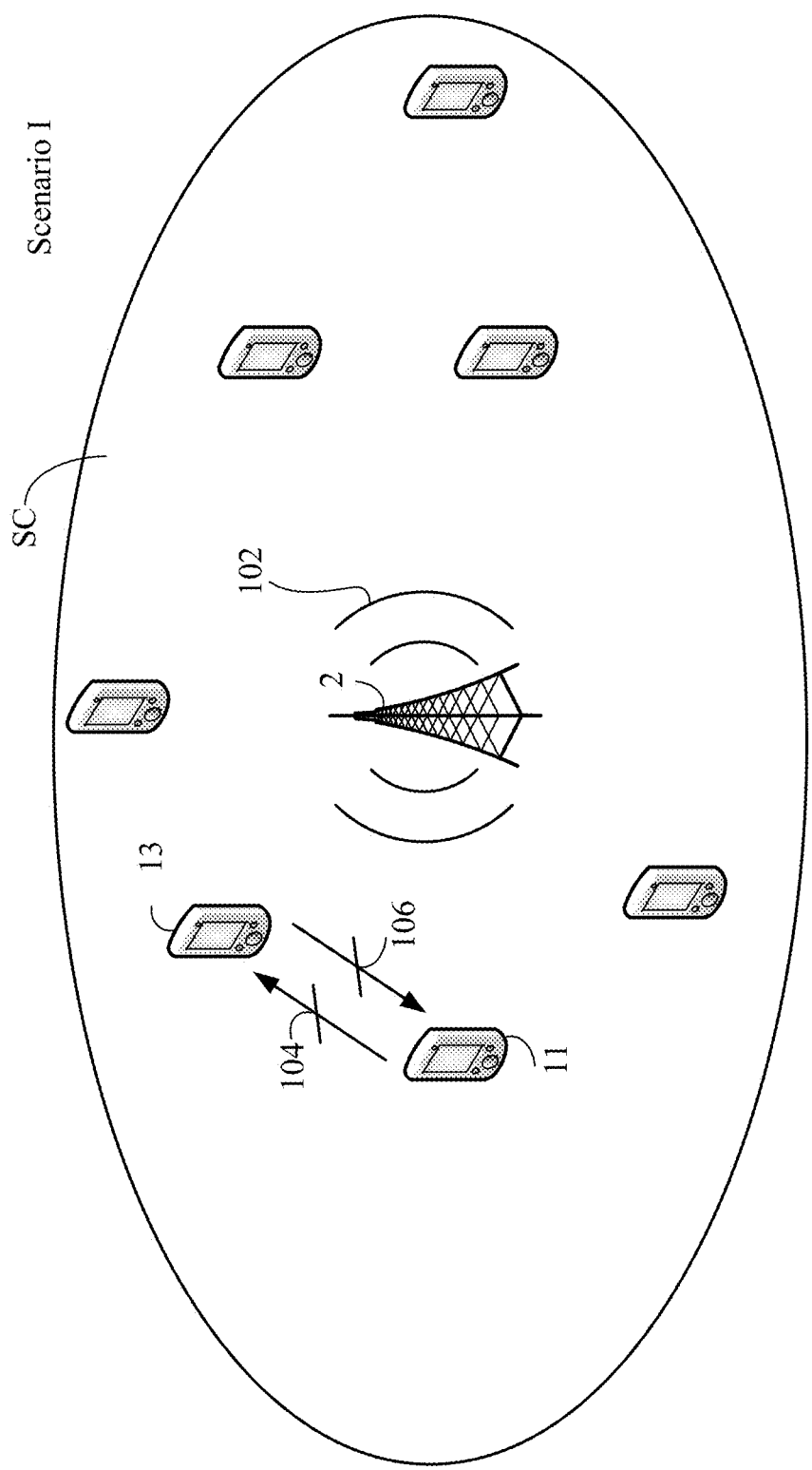
FIGS. 4A-4C depict a scenario according to a second embodiment of the present invention.
Figure 4B:
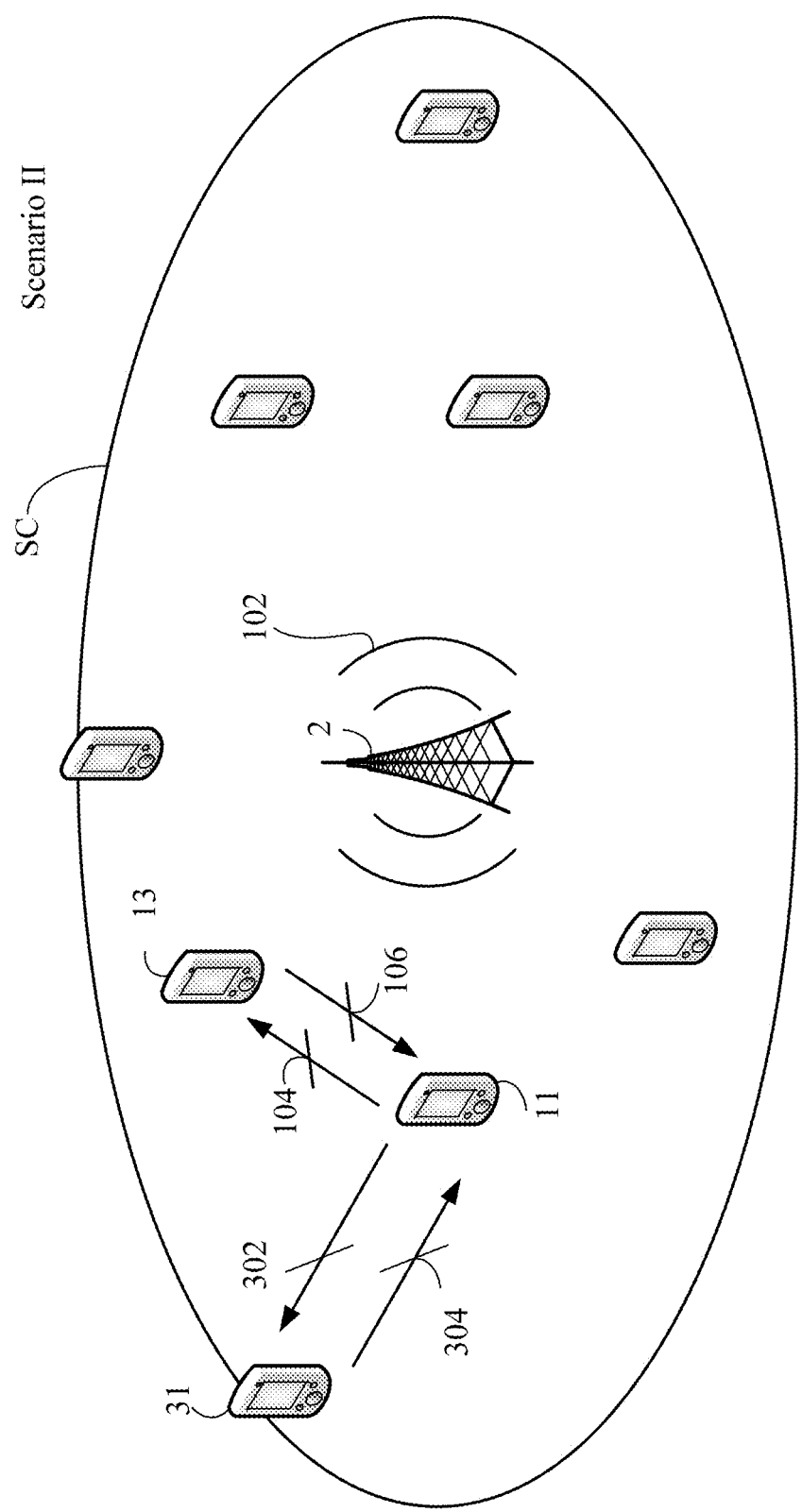
Figure 4C:
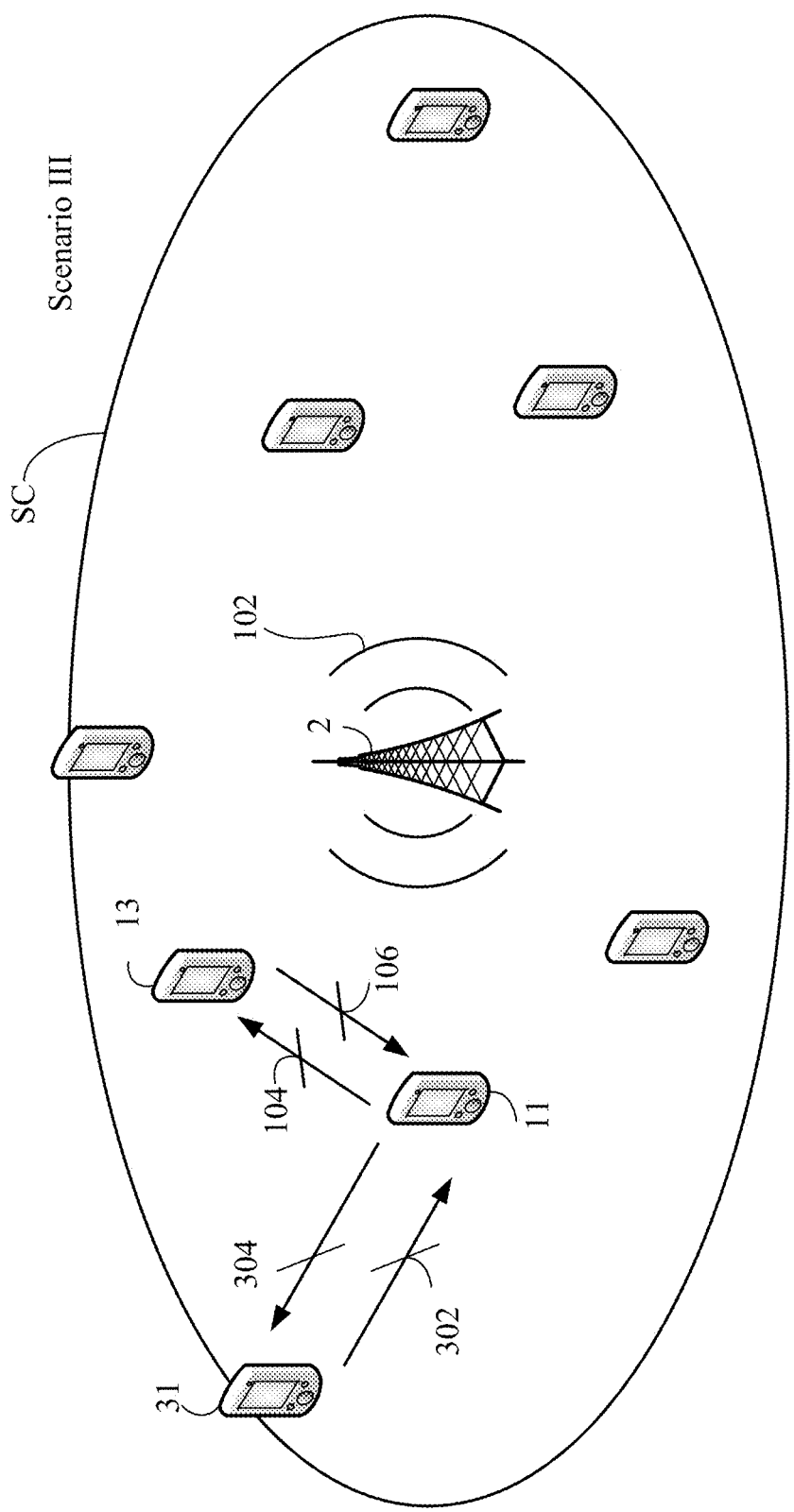

A second embodiment of the present invention is shown in FIGS. 4A-4C. The base station 2 has a signal coverage SC. In a scenario I shown in FIG. 4A, a processor 201 of the base station 2 may choose a D2D resource block according to a default resource request to generate the D2D hybrid access map. It should be appreciated that, the default resource request may record the previous transmission demands of D2D UEs or record a default amount of resources demanded, so the base station 2 can choose a D2D resource block(s) of an appropriate size or an appropriate number of D2D resource blocks according to the default resource request. Next, the base station 2 transmits the wireless signal 102 that carries the D2D hybrid access map through broadcasting. Then, the first D2D UE 11 and the second D2D UE 13 perform the D2D data transmission according to the aforesaid D2D handshake procedure after receiving the wireless signal 102.

In a scenario II shown in FIG. 4B, apart from requesting the second D2D UE 13 for data transmission therebetween, the first D2D UE 11 also requests another D2D UE (i.e., a third D2D UE 31) for D2D data transmission therebetween. In the scenario II, the first D2D UE 11 and the third D2D UE 31 also need to execute the D2D handshake procedure therebetween. Specifically, the first D2D UE 11 may further transmit another D2D hybrid access request 302 to the third D2D UE 31 via the D2D resource block. Then, the third D2D UE 31 transmits another D2D hybrid access response 304 to the first D2D UE 11 via the D2D resource block after receiving the D2D hybrid access request 302. Accordingly, the first D2D UE 11 and the third D2D UE 31 also perform the D2D data transmission according to the D2D data transmission information carried in the D2D hybrid access response 304.

In a scenario III shown in FIG. 4C, besides that the first D2D UE 11 requests the second D2D UE 13 for D2D data transmission therebetween, the third D2D UE 31 also requests the first D2D UE 11 for D2D data transmission therebetween. In other words, the first D2D UE 11 may request other D2D UEs for D2D data transmission therebetween, and may also be requested by other D2D UEs for D2D data transmission therebetween. Specifically, according to the D2D hybrid access map, the third D2D UE 31 transmits the D2D hybrid access request 302 to the first D2D UE 11 via the D2D resource block. Then, the first D2D UE 11 transmits the D2D hybrid access response 304 to the third D2D UE 31 via the D2D resource block after receiving the D2D hybrid access request 302. Thus, the third D2D UE 31 and the first D2D UE 11 accomplish the D2D handshake procedure and begin to perform the D2D data transmission.

It should be appreciated that, in other embodiments, the second D2D UE 13 may also be requested by other D2D UEs for D2D data transmission therebetween at the same time, or request other D2D UEs for D2D data transmission therebetween at the same time so as to perform another D2D handshake procedure. Because how the second D2D UE 13 performs D2D data transmissions with different D2D UEs at the same time can be readily understood by those of ordinary skill in the art according to the above descriptions, it will not be further described herein. Furthermore, the terms "the first", "the second" and "the third" used in such expressions as "the first" D2D UE, "the second" D2D UE and "the third" D2D UE set forth herein are only used for ease of representing different D2D UEs and do not have other specific meanings, so the D2D UE 1 of the present invention may be one of the first D2D UE, the second D2D UE, and the third D2D UE in different exemplary embodiments.

Additionally, because the D2D hybrid access request and the D2D hybrid access response are transmitted via specific resource blocks among the D2D resource blocks respectively in this embodiment, the different D2D UEs will contend to transmit the D2D hybrid access requests when three or more D2D UEs use the same D2D resource block at the same time. For example, because the aforesaid first D2D UE, second D2D UE and third D2D UE use the same D2D resource block to perform the D2D data transmission in the scenario III shown in FIG. 4C, collisions may happen between the D2D hybrid access request 104 transmitted by the first D2D UE 11 and the D2D hybrid access request 302 transmitted by the third D2D UE 31. Therefore, contention must be made for transmission.

Figure 5:
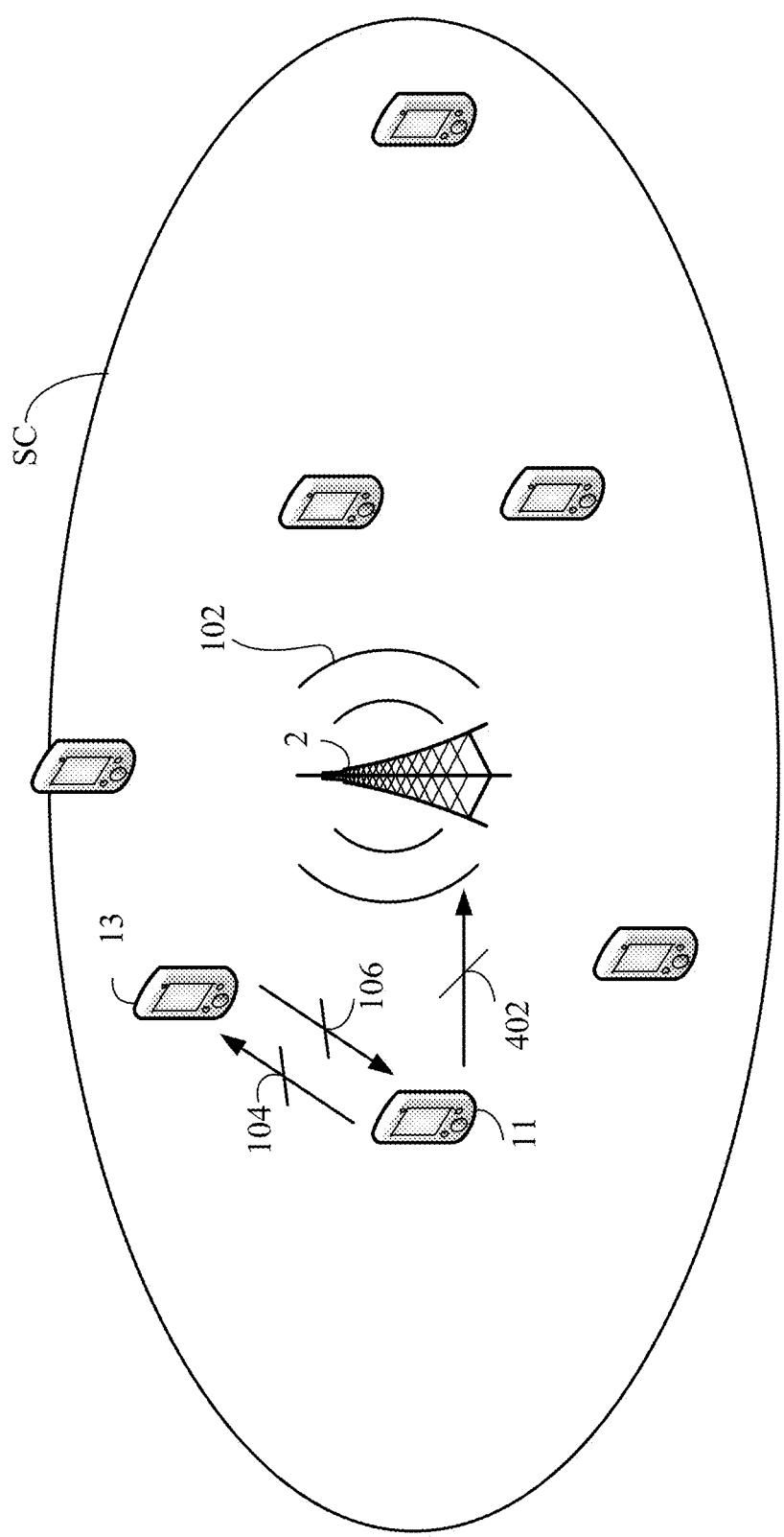
FIG. 5 depicts a scenario according to a third embodiment of the present invention.

A third embodiment of the present invention is shown in FIG. 5. This embodiment differs from the scenario I of the second embodiment shown in FIG. 3A in that, the first D2D UE 11 may generate a resource request 402 and then transmit the resource request 402 to the base station 2 via the hybrid access channel. Accordingly, the base station 2 can choose a D2D resource block of an appropriate size or an appropriate number of D2D resource blocks according to the resource request 402 received so as to generate the D2D hybrid access map and, through broadcasting, transmit the wireless signal 102 that carries the D2D hybrid access map. Similarly, the scenario in FIG. 5 can extend the scenario II shown in FIG. 4B and the scenario III shown in FIG. 4C; and specifically in this embodiment, the D2D UE that requests other D2D UEs for D2D data transmission therebetween needs to transmit the resource request to the base station 2, and then the base station 2 can choose a D2D resource block of an appropriate size or an appropriate number of D2D resource blocks according to these resource request.

As described above, when three or more D2D UEs use the same D2D resource block at the same time, the different D2D UEs will contend to transmit the D2D hybrid access requests. On the other hand, the base station 2 can allocate different D2D resource blocks to the D2D UEs that request to perform the D2D data transmission (i.e., the D2D UEs that transmit the resource requests) according to the different resource requests received, and in this way, collisions can be prevented and the D2D hybrid access requests can be transmitted without contention.

Figure 6:
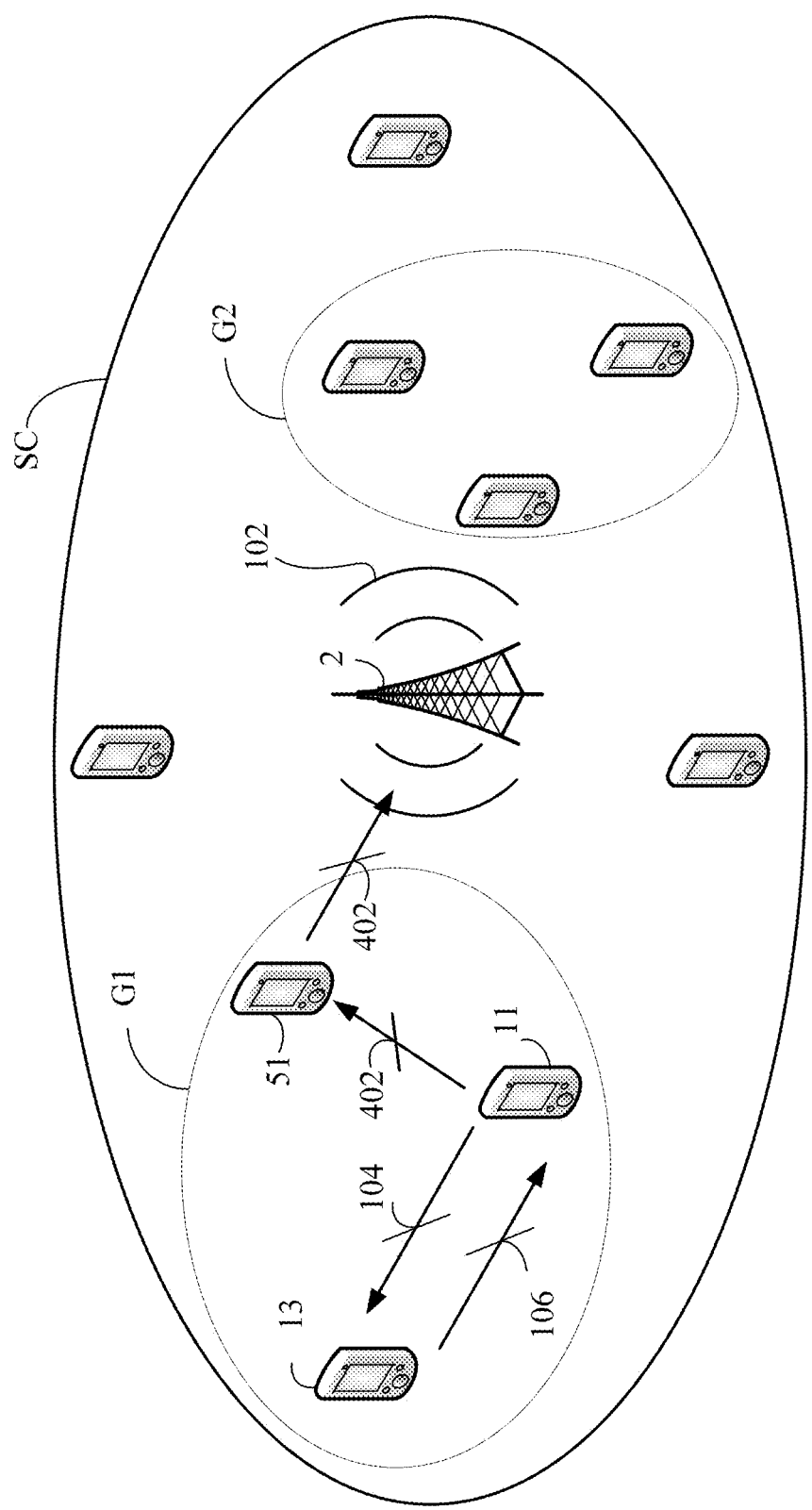
FIG. 6 depicts a scenario according to a fourth embodiment of the present invention.

A fourth embodiment of the present invention is shown in FIG. 6. In this embodiment, there are one or more D2D groups (e.g., a D2D group G1 and a D2D group G2) located in the signal coverage of the base station 2, and the base station 2 may choose a plurality of D2D resource blocks from the resource pool for use by the D2D UEs in different groups. Each of the D2D groups consists of a plurality of adjacent D2D UEs to perform D2D group communications. Taking the D2D group G1 as an example, it comprises the D2D UE 11, the D2D UE 13 and a D2D UE 51, and the D2D UE 51 acts as a coordinator in the group. Specifically, in this embodiment, a D2D UE that requests other D2D UEs for D2D data transmission therebetween needs to transmit the resource request to the coordinator of the D2D group via the hybrid access channel so that the coordinator relays the resource request to the base station 2 via the hybrid access channel.

For example, in the D2D group G1, the D2D UE 51 receives the resource request 402 from the D2D UE 11. Next, the D2D UE 51 relays the resource request 402 to the base station 2. Then, the base station 2 chooses a D2D resource block of an appropriate size or an appropriate number of D2D resource blocks according to the resource request 402 so as to generate the D2D hybrid access map and, through broadcasting, transmit the wireless signal 102 that carries the D2D hybrid access map.

In this embodiment, a D2D UE that requests other D2D UEs for D2D data transmission therebetween can firstly transmit the resource request to the adjacent D2D UE that acts as the coordinator with a relatively low transmission power so as to reduce the interferences generated when signals are transmitted by different UEs. When the D2D UE 1 is the D2D UE 51, the transceiver 101 receives the resource request 402 from the D2D UE 11, and relays the resource request 402 to the base station 2 via the hybrid access channel. Additionally, when the D2D UE 1 is the UE 11, the transceiver 101 transmits the resource request 402 to the D2D UE 51 via the hybrid access channel.

It should be appreciated that, in this embodiment, the D2D UE 51 may also request other D2D UEs for D2D data transmission therebetween or be requested by other D2D UEs for D2D data transmission therebetween, which is similar to the scenario II shown in FIG. 4B and the scenario III shown in FIG. 4C. In this case, the D2D UE 51 will also receive the resource requests from other D2D UEs or generate a resource request of itself, and then transmit the received resource request or the resource request of itself to the base station 2. Because how the D2D UEs in the D2D group G2 operate can be readily understood by those of ordinary skill in the art according to the above descriptions, this will not be further described herein.

Additionally, because the D2D UEs in the D2D group G1 use the same D2D resource block at the same time, the D2D hybrid access requests must be transmitted through contention if there are a plurality of pairs of D2D UEs desiring to perform the D2D data transmission. However, in other embodiments, when the D2D groups is formed, the D2D UE (i.e., the D2D UE 51) that acts as the coordinator may also firstly coordinate with the D2D UEs in the group about the time sequence of transmitting the D2D hybrid access requests so as to prevent collisions and to prevent contentions in transmission of the D2D hybrid access requests. Furthermore, the D2D UE may also firstly monitor the using status of the D2D resource blocks, and then generate the D2D hybrid access response carrying the D2D data transmission information so as to prevent that a specific sub-resource block is repeatedly allocated to perform the D2D data transmission.

Figure 7:
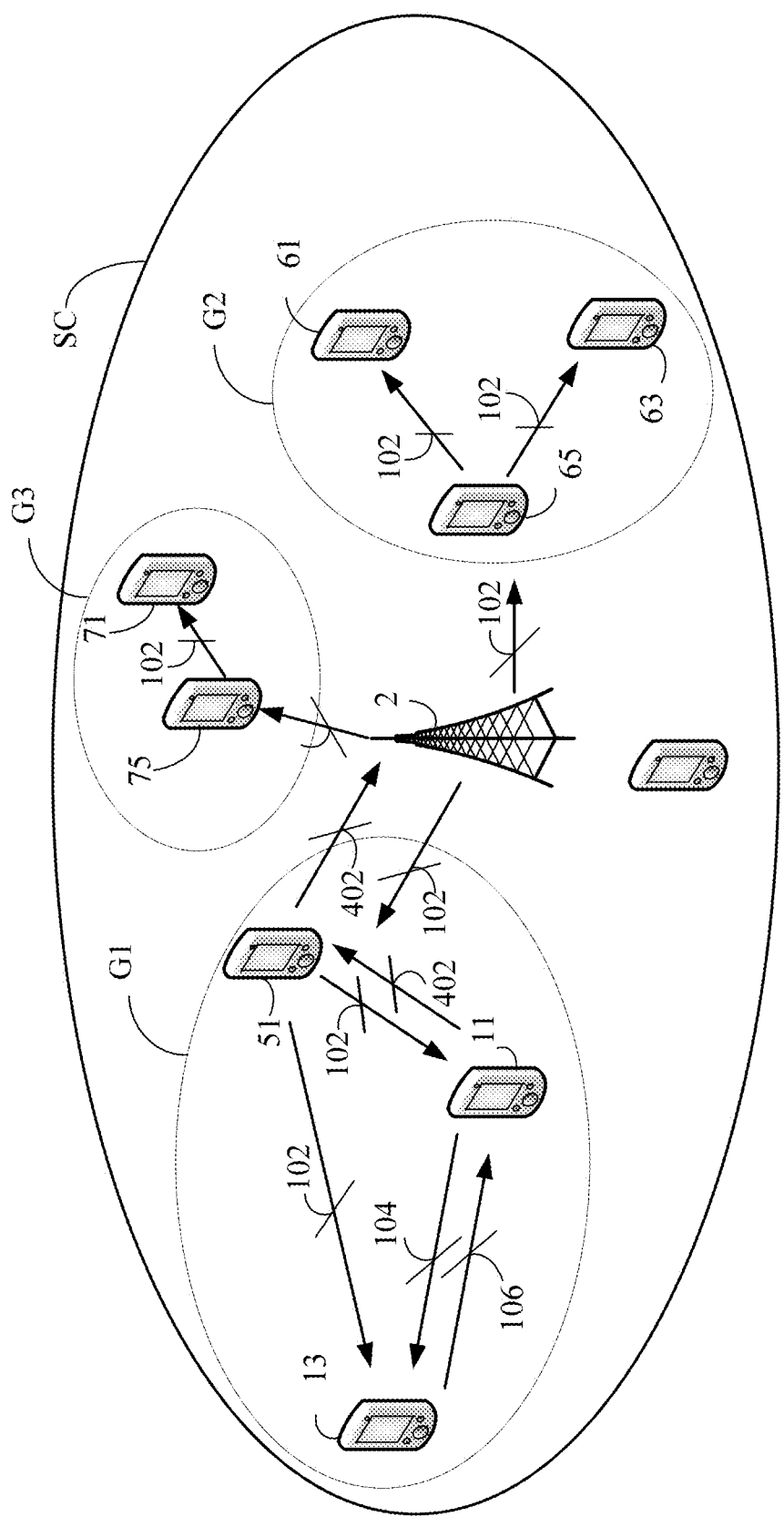
FIG. 7 depicts a scenario according to a fifth embodiment of the present invention.

A fifth embodiment of the present invention is shown in FIG. 7. This embodiment differs from the fourth embodiment in that, the base station 2 transmits the wireless signal 102 to the coordinator in each of the D2D groups (e.g., the D2D UE 51 in the D2D group G1, a UE 65 in the D2D group G2 and a UE 75 in the D2D group G3) through multicasting. Taking the D2D group G1 as an example, when the D2D UE 1 is the D2D UE 51, the transceiver 101 further relays the wireless signal 102 to the first D2D UE 11 and the second D2D UE 13 via the hybrid access channel after receiving the wireless signal 102 from the base station 2. Accordingly, the first D2D UE 11 and the second D2D UE 13 can perform the D2D data transmission according to the D2D hybrid access map carried in the wireless signal 102. Similarly, in the D2D group G2, the D2D UE 65 further relays the wireless signal 102 to the D2D UE 61 and the D2D UE 63; and in the D2D group G3, the D2D UE 75 further relays the wireless signal 102 to the D2D UE 71.

A sixth embodiment of the present invention is shown in FIGS. 8A-8D. The scenario I shown in FIG. 8A differs from the third embodiment in that, the first D2D UE 11 is located out of the signal coverage SC of the base station 2, so the second D2D UE 13 needs to relay the resource request 402 to the base station 2 and relay the wireless signal 102 to the first D2D UE 11.

Specifically, when the D2D UE 1 is the first D2D UE 11, the transceiver 101 transmits the resource request 402 to the second D2D UE 13 via the hybrid access channel and receives the wireless signal 102 from the second D2D UE 13. On the other hand, when the D2D UE 1 is the second D2D UE 13, the transceiver 101 receives the resource request 402 from the first D2D UE 11, relays the resource request 402 to the base station 2 via the hybrid access channel, and relays the wireless signal 102 to the first D2D UE 11 via the hybrid access channel after receiving the wireless signal 102.

Figure 8A:
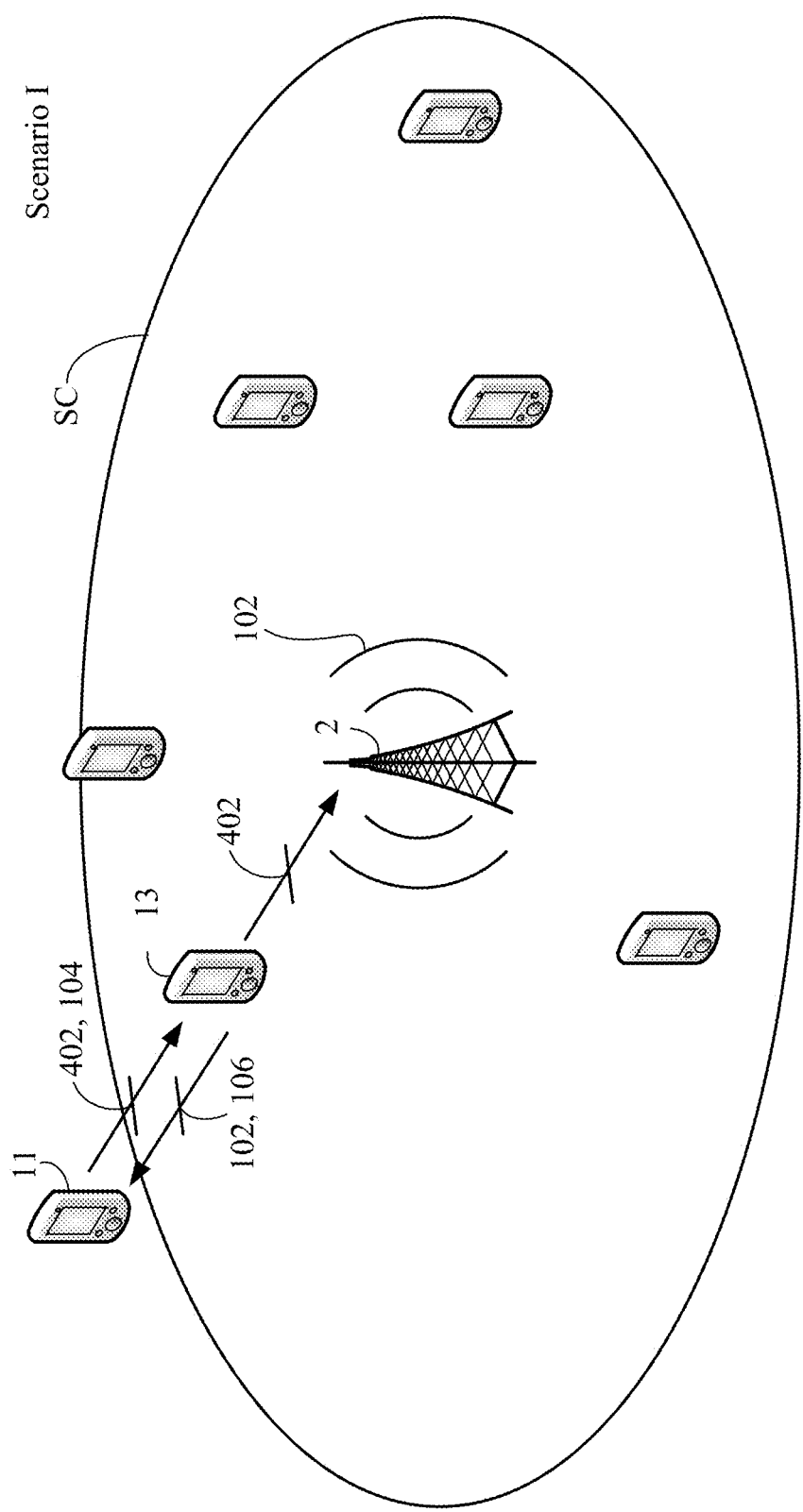
FIGS. 8A-8D depict a scenario according to a sixth embodiment of the present invention.
Figure 8B:
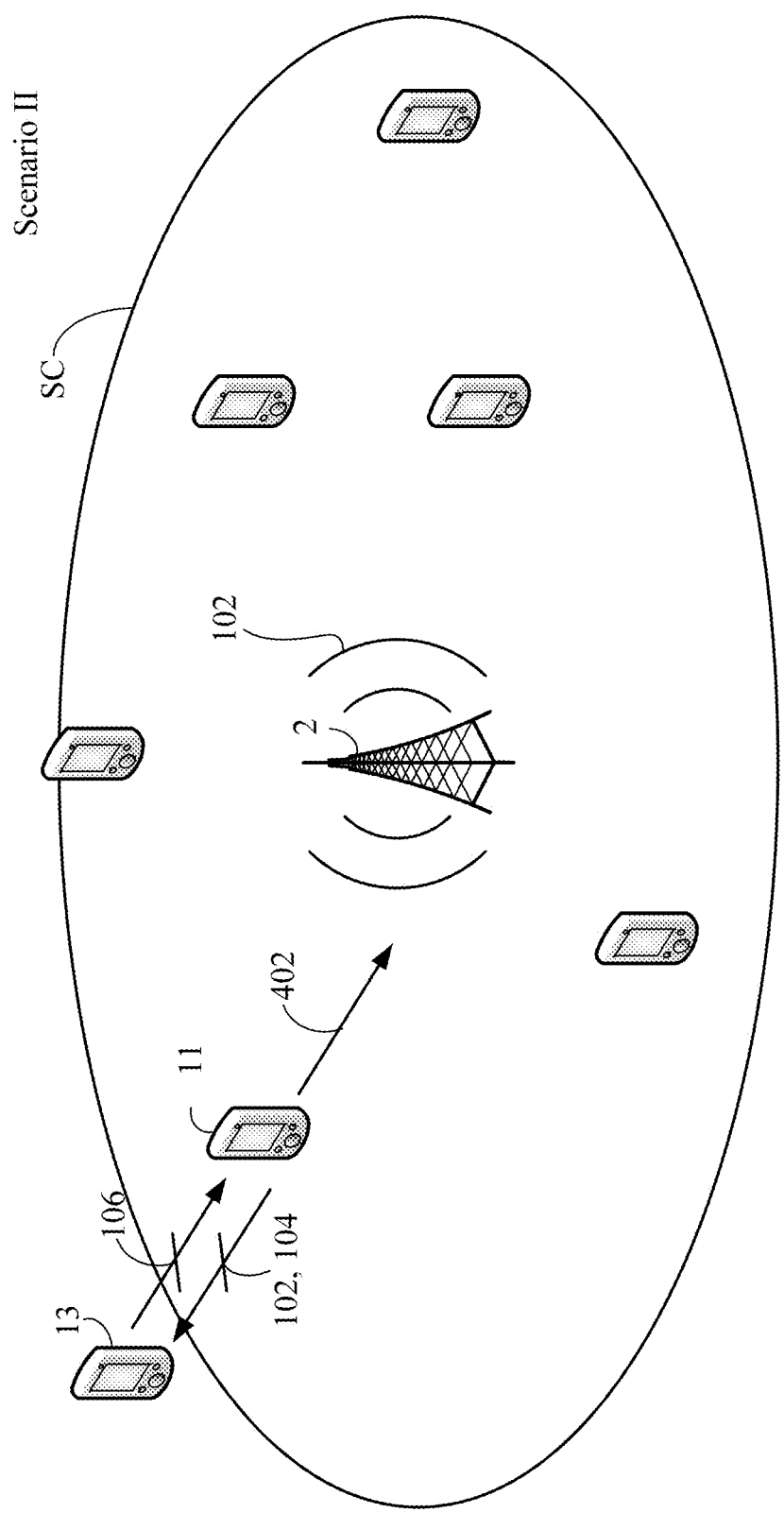

Furthermore, in the scenario II shown in FIG. 8B, the second D2D UE 13 is located out of the signal coverage SC of the base station 2, so the first D2D UE 11 needs to relay the wireless signal 102 to the second D2D UE 13. Specifically, when the D2D UE 1 is the first D2D UE 11, the transceiver 101 relays the wireless signal 102 to the second D2D UE 13 via the hybrid access channel after receiving the wireless signal 102. On the other hand, when the D2D UE 1 is the second D2D UE 13, the transceiver 101 receives the wireless signal 102 from the first D2D UE 11.

Figure 8C:
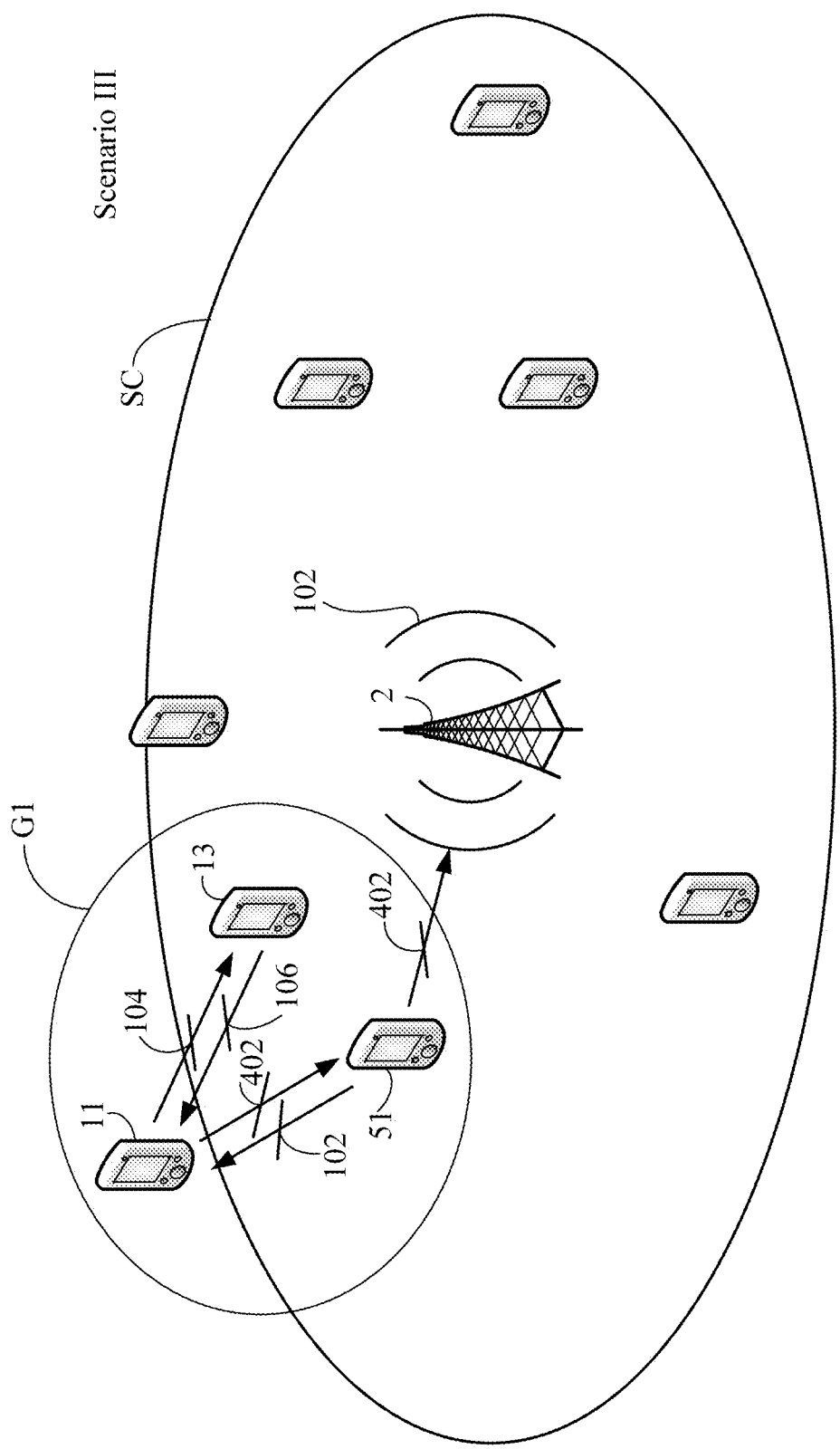

The scenario III shown in FIG. 8C differs from the scenario I shown in FIG. 8A in that, there is a D2D group G1, which comprises the first D2D UE 11, the second D2D UE 13 and the D2D UE 51. In this case, the D2D UE 51 needs to relay the resource request 402 to the base station 2 and relay the wireless signal 102 to the first D2D UE 11. When the D2D UE 1 is the first D2D UE 11, the transceiver 101 transmits the resource request 402 to the D2D UE 51 via the hybrid access channel and receives the wireless signal 102 from the D2D UE 51. On the other hand, when the D2D UE 1 is the D2D UE 51, the transceiver 101 receives the resource request 402 from the first D2D UE 11, relays the resource request 402 to the base station 2 via the hybrid access channel, and relays the wireless signal 102 to the first D2D UE 11 via the hybrid access channel after receiving the wireless signal 102.

It should be appreciated that, if there is a D2D UE that located out of the signal coverage of the base station in the D2D group, then a D2D UE that is close to the boundary of the signal coverage of the base station acts as the coordinator. For example, when the received strength of the wireless signal received by the D2D UE 51 from the base station 2 is smaller than a threshold value, then it is determined that the D2D UE 51 itself is a boundary node of the signal coverage of the base station, so the D2D UE 51 acts as the coordinator in this embodiment. In other embodiments, if there are a plurality of boundary nodes of the signal coverage of the base station in the D2D group, then the boundary nodes may decide which one of them will act as the coordinator through communication and coordination or through other preset mechanisms in advance. Because how to decide which D2D UE shall act as the coordinator through the current technologies can be understood by those of ordinary skill in the art, it will not be further described herein.

Figure 8D:
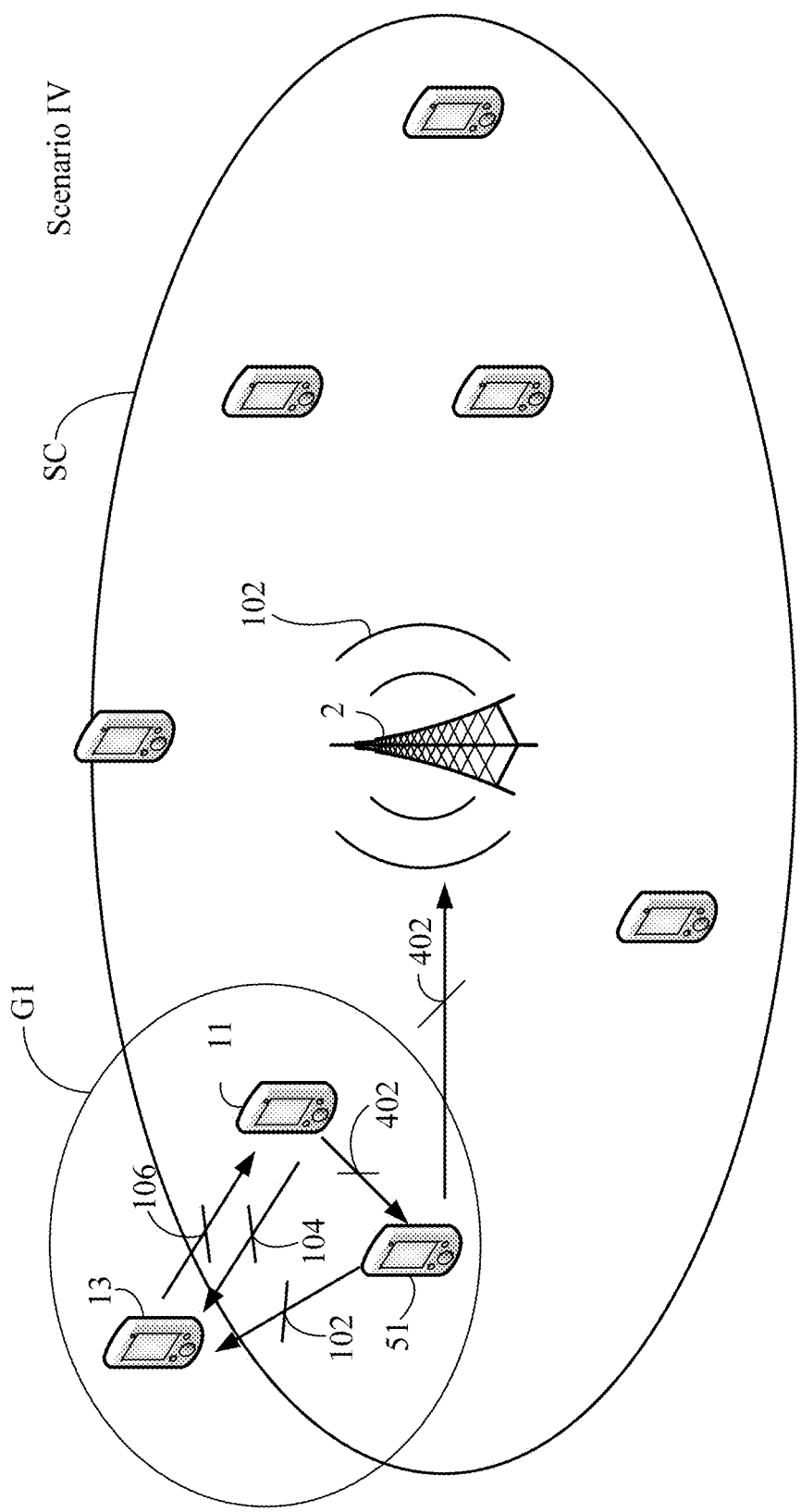

The scenario IV shown in FIG. 8D differs from the scenario II shown in FIG. 8B in that, there is the D2D group G1, which comprises the first D2D UE 11, the second D2D UE 13 and the D2D UE 51. In this case, the D2D UE 51 needs to relay the wireless signal 102 to the second D2D UE 13. When the D2D UE 1 is the second D2D UE 13, the transceiver 101 receives the wireless signal 102 from the D2D UE 51 via the hybrid access channel. On the other hand, when the D2D UE 1 is the D2D UE 51, the transceiver 101 relays the wireless signal 102 to the second D2D UE 13 via the hybrid access channel after receiving the wireless signal 102. Similarly, in this embodiment, when the received strength of the wireless signal received by the D2D UE 51 from the base station 2 is smaller than a threshold value, then it is determined that the D2D UE 51 itself is a boundary node of the signal coverage of the base station, so the D2D UE 51 of this embodiment will act as the coordinator.

Briefly speaking, in this embodiment, the resource request to be transmitted from the D2D UE located out of the signal coverage SC of the base station 2 to the base station 2 is relayed by the D2D UE located in the signal coverage SC, and the D2D UE located in the signal coverage SC also relays the wireless signal 102 to the D2D UE located out of the signal coverage SC of the base station 2. When there is no D2D group, the relaying action is executed by one of the two D2D UEs that are to perform the D2D data transmission (i.e., the D2D UE located in the signal coverage SC); and when there is a D2D group, the relaying action is executed by the coordinator in the D2D group.

Figure 9A:
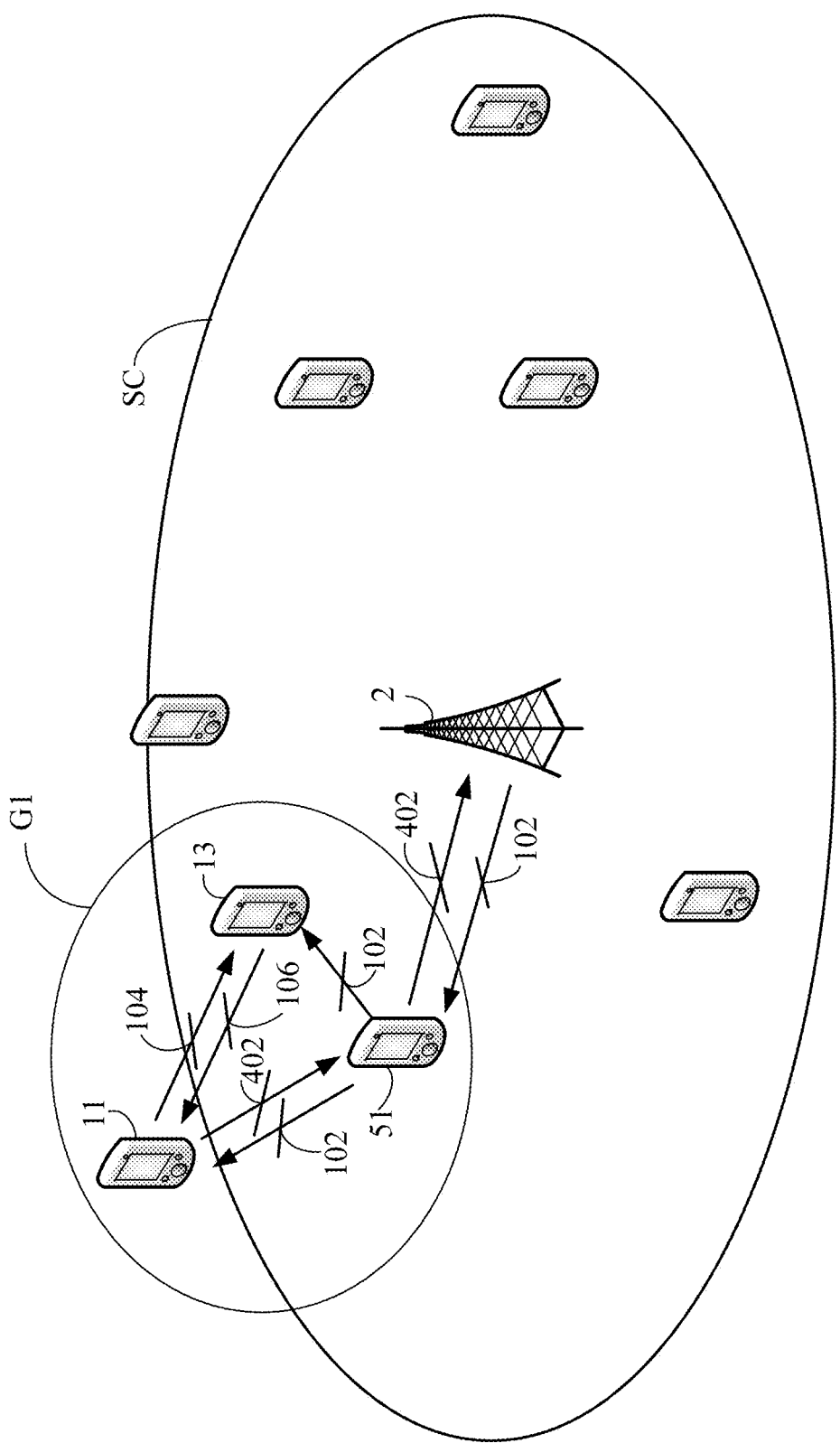
FIGS. 9A-9B depict a scenario according to a seventh embodiment of the present invention.
Figure 9B:
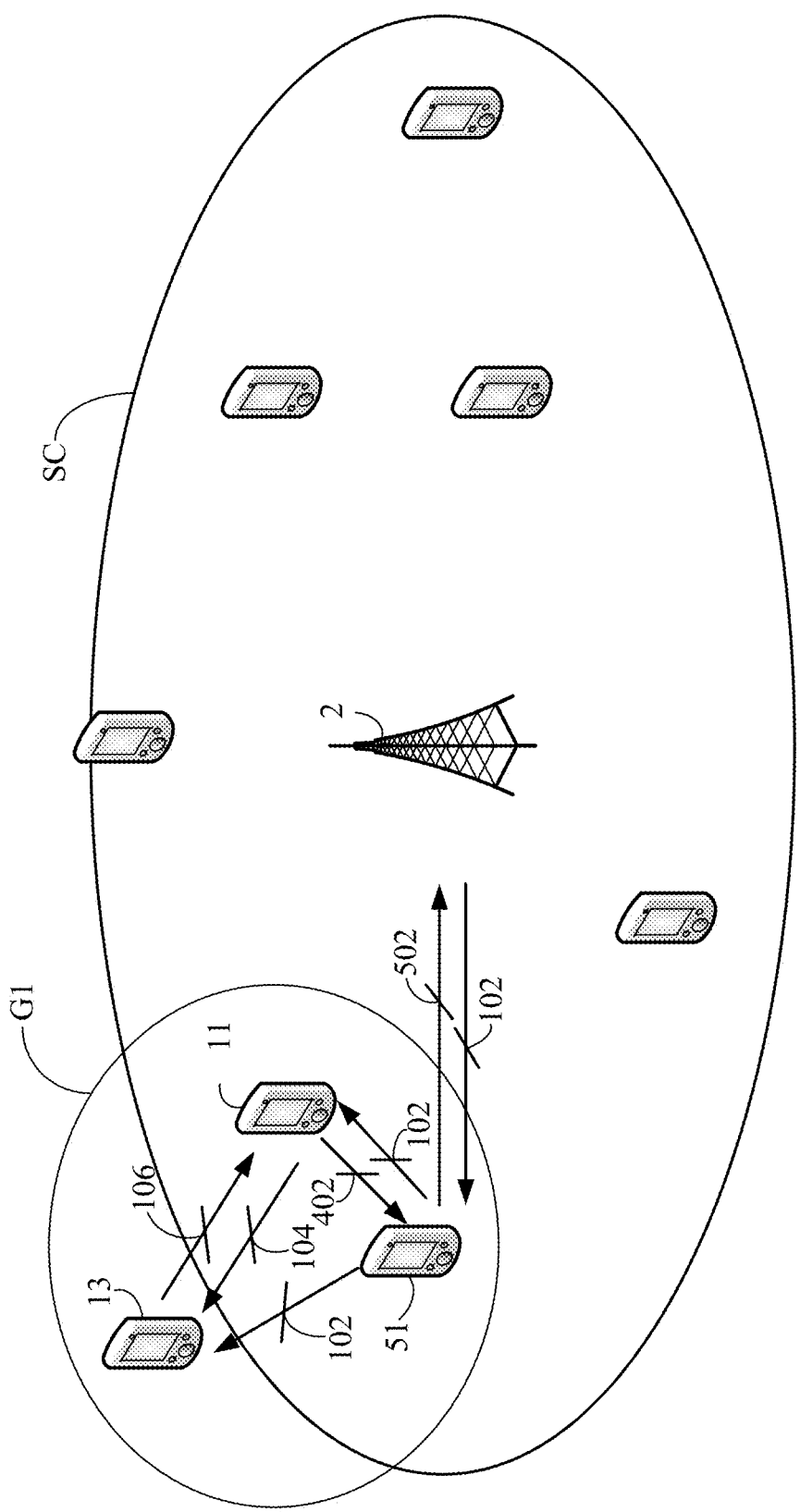

A seventh embodiment of the present invention is shown in FIGS. 9A-9B. This embodiment differs from the scenario III and the scenario IV of the sixth embodiment in that, the base station 2 also transmits the wireless signal 102 to the UE 51 through multicasting, so the D2D UE 51 needs to relay the wireless signal 102 to the first D2D UE 11 and the second D2D UE 13. Specifically, the D2D UE 51 needs to relay the wireless signal 102 to the first D2D UE 11 and the second D2D UE 13, and relay the resource request 402 to the base station 2. Accordingly, when the D2D UE 1 is the D2D UE 51, the transceiver 101 needs to relay the wireless signal 102 to the first D2D UE 11 and the second D2D UE 13. Furthermore, when the D2D UE 1 is the first D2D UE 11 or the second D2D UE 13, the transceiver 101 receives the wireless signal 102 from the D2D UE 51.

Figure 10:
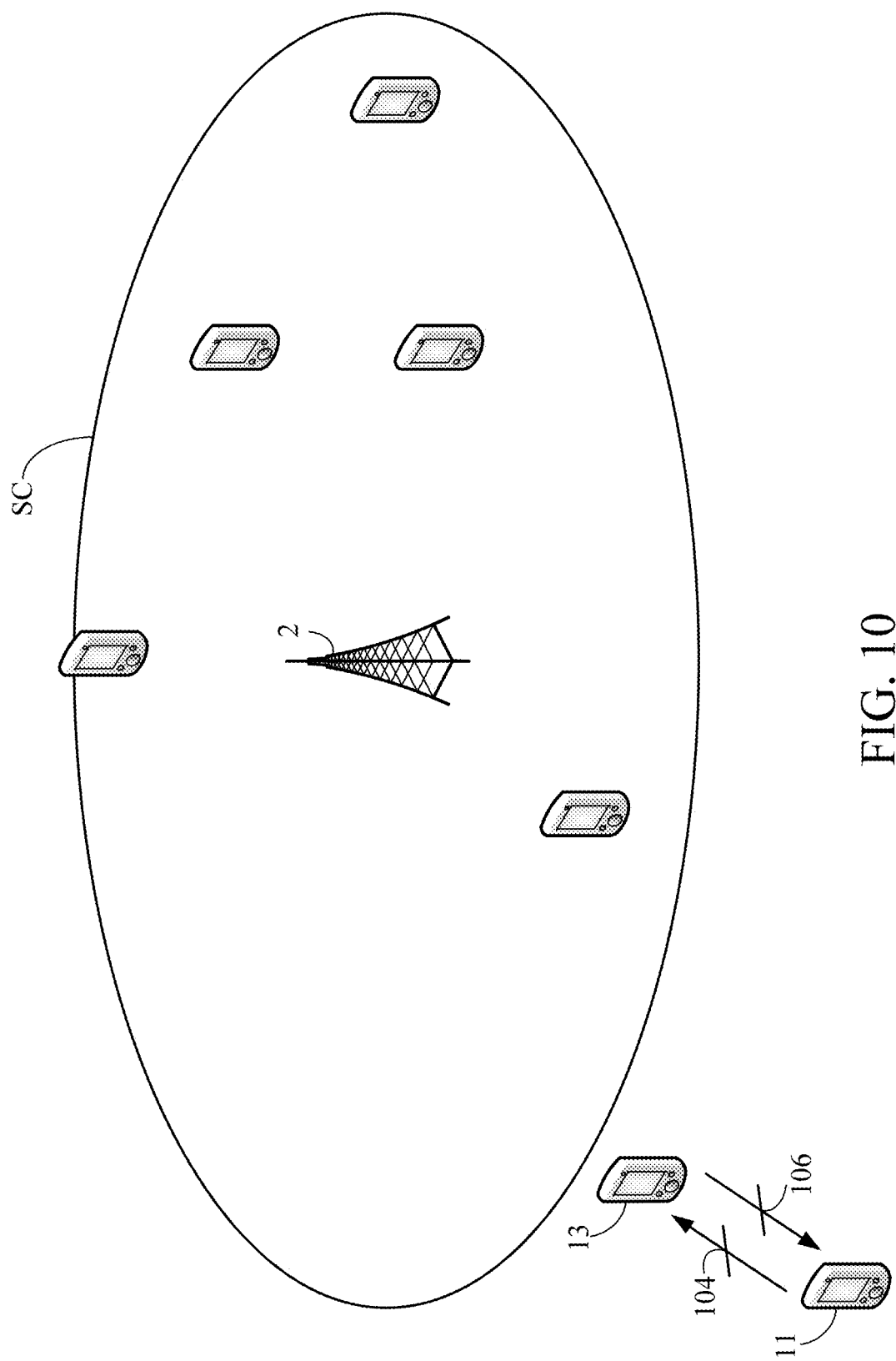
FIG. 10 depicts a scenario according to an eighth embodiment of the present invention.

An eighth embodiment of the present invention is shown in FIG. 10. In this embodiment, the first D2D UE 11 and the second D2D UE 13 are both located out of the signal coverage SC of the base station 2. When the first D2D UE 11 is to perform the D2D data transmission with the second D2D UE 13, it transmits the D2D hybrid access request 104 to the second D2D UE 13 via the hybrid access channel. The second D2D UE 13 then transmits the D2D hybrid access response 106 to the first D2D UE 11 via the hybrid access channel after receiving the D2D hybrid access request 104. In other words, in this embodiment, the hybrid access channel is a preset resource block; and when the two D2D UEs that are to perform the D2D data transmission are both located out of the signal coverage SC of the base station 2, they can directly use the hybrid access channel to perform the handshake procedure so as to perform the D2D data transmission.

Figure 11:
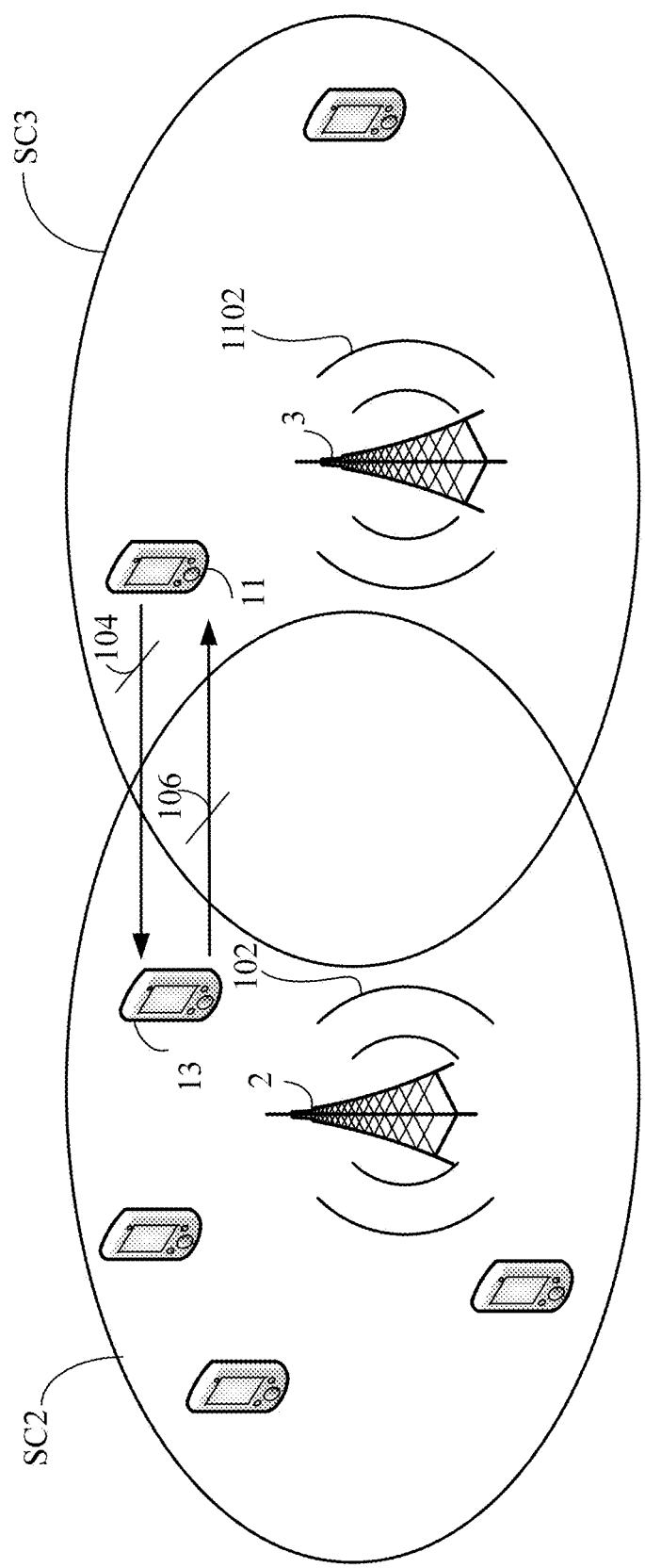
FIG. 11 depicts a scenario according to a ninth embodiment of the present invention.

A ninth embodiment of the present invention is shown in FIG. 11. In this embodiment, the first D2D UE 11 and the second D2D UE 13 are located in signal coverages of different base stations respectively. As shown in FIG. 11, the first D2D UE 11 is located in the signal coverage SC3 of a base station 3, and the second D2D UE 13 is located in the signal coverage SC2 of the base station 2. Because the radio resources used by the base station 2 and the base station 3 are different (i.e., do not overlap), the base station 2 and the base station 3 firstly perform a negotiation procedure via a backhaul network or the communication interface between the base stations (e.g., an X2 interface or a physical device to device synchronization channel (PD2DSCH)) to decide whose radio resources are to be allocated to the first D2D UE 11 and the second D2D UE 13 in this case. After the negotiation procedure between the base station 2 and the base station 3 is accomplished, the D2D resource blocks to be used by the first D2D UE 11 and the second D2D UE 13 to perform the D2D data transmission can be decided.

Accordingly, the processor 201 of the base station 2 further generates a piece of frequency negotiation information according to the negotiation procedure between the base station 2 and the base station 3, and then loads the frequency negotiation information into the hybrid access channel of the wireless signal 102. Similarly, the base station 3 also generates a wireless signal 1102, which also comprises a hybrid access channel carrying the frequency negotiation information. Then, the base station 2 and the base station 3 transmit the wireless signal 102 and the wireless signal 1102 to the D2D UEs located in their respective signal coverages through broadcasting respectively.

Figure 12:
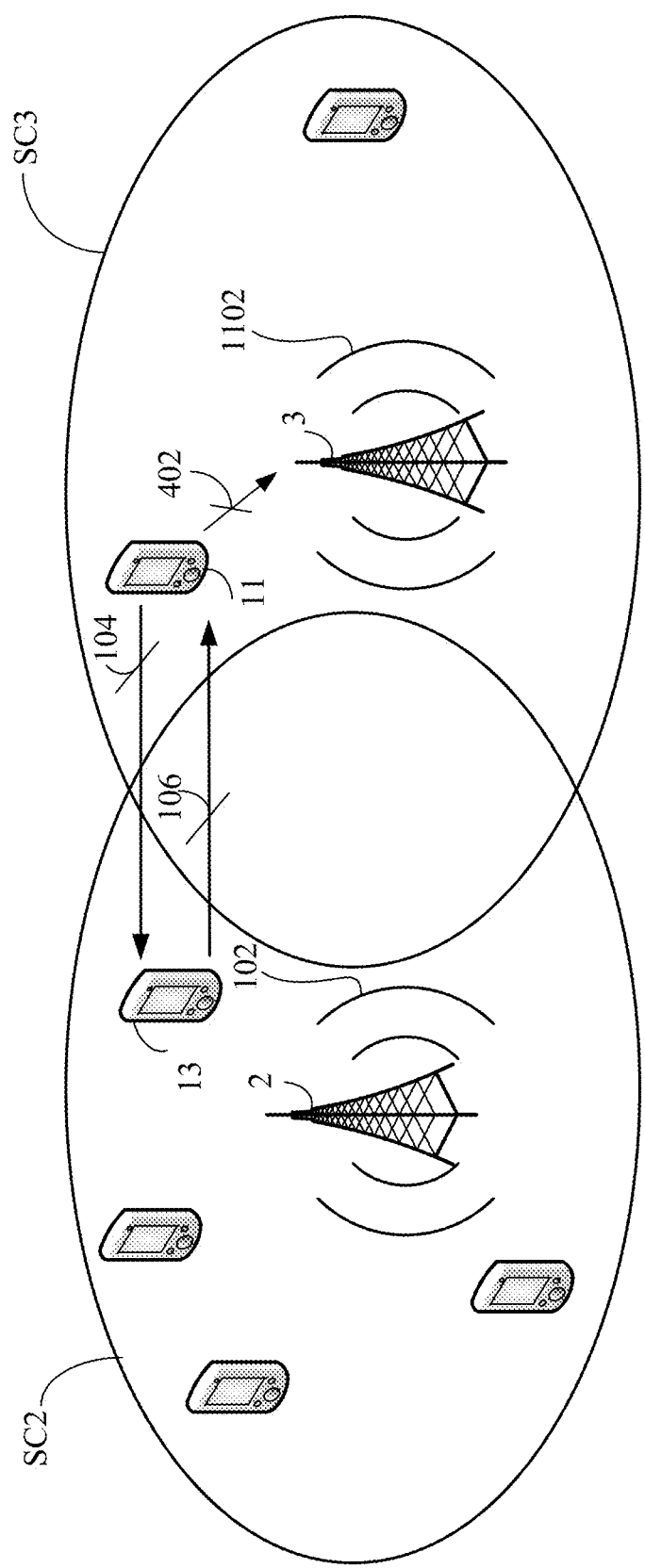
FIG. 12 depicts a scenario according to another embodiment of the present invention.

In this embodiment, the base station 2 and the base station 3 perform the negotiation procedure and generate the D2D hybrid access map according to the default resource request. However, in other embodiments, the base station 2 and the base station 3 may perform the negotiation procedure and generate the D2D hybrid access map according to the resource requests received from the D2D UEs. For example, as shown in FIG. 12, the first D2D UE 11 transmits the resource request 402 to the base station 3.

Figure 13:
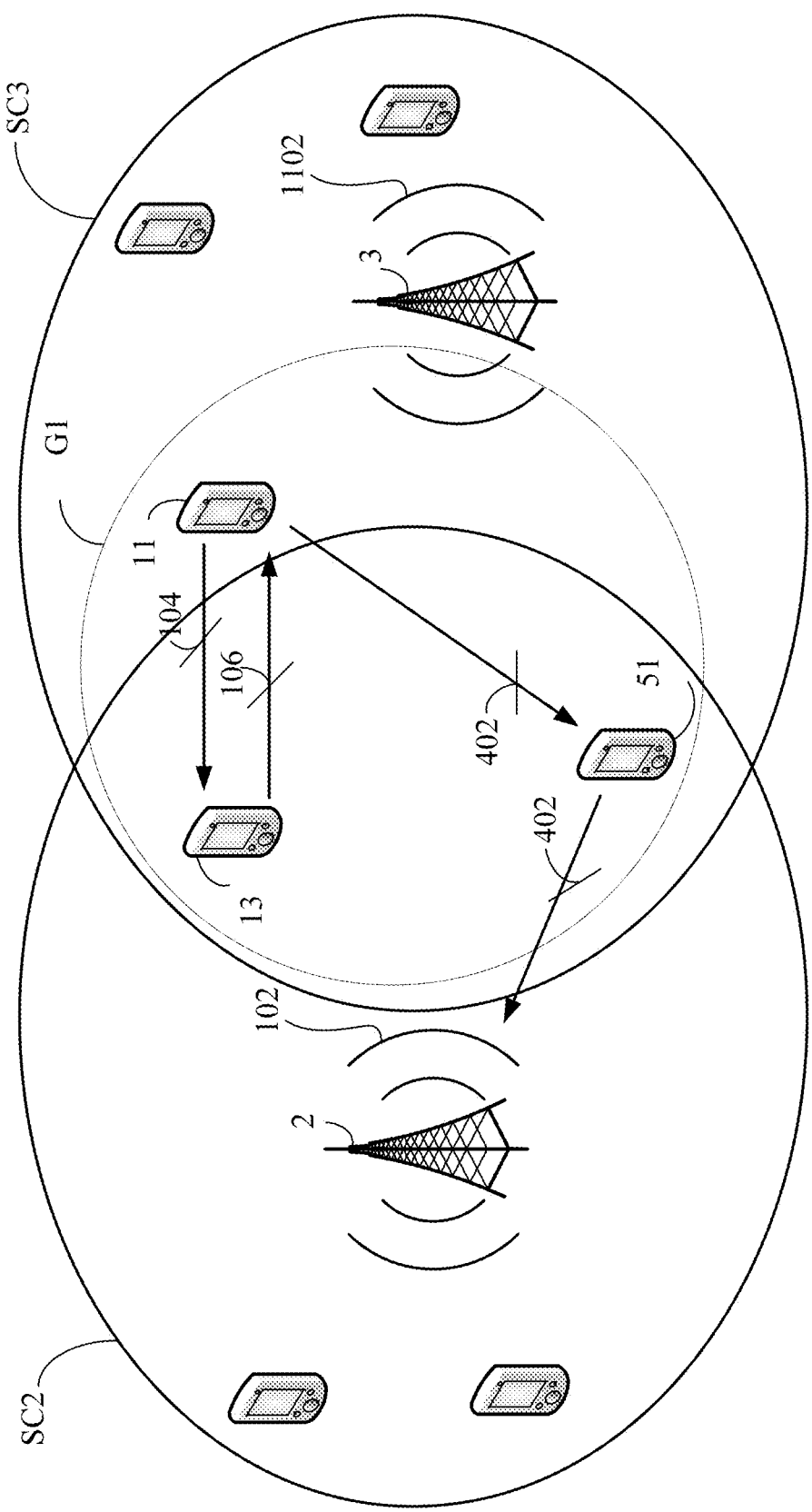
FIG. 13 depicts a scenario according to a tenth embodiment of the present invention.

A tenth embodiment of the present invention is shown in FIG. 13. In this embodiment, there is the D2D group G1, and the coordinator (i.e., the D2D UE 51) is located in the signal coverage SC2 of the base station 2 and the signal coverage SC3 of the base station 3 at the same time. When the first D2D UE 11 is to perform the data transmission with the second D2D UE 13, it transmits the resource request 402 to the D2D UE 51. Then, the D2D UE 51 relays the resource request 402 to the base station 2. It should be appreciated that, here it is assumed that the D2D UE 51 is closer to the base station 2 and preferentially connects with the base station 2, so the D2D UE 51 relays the resource request 402 to the base station 2. However, in other embodiments, the D2D UE 51 may also relay the resource request 402 to the base station 3.

Figure 14:
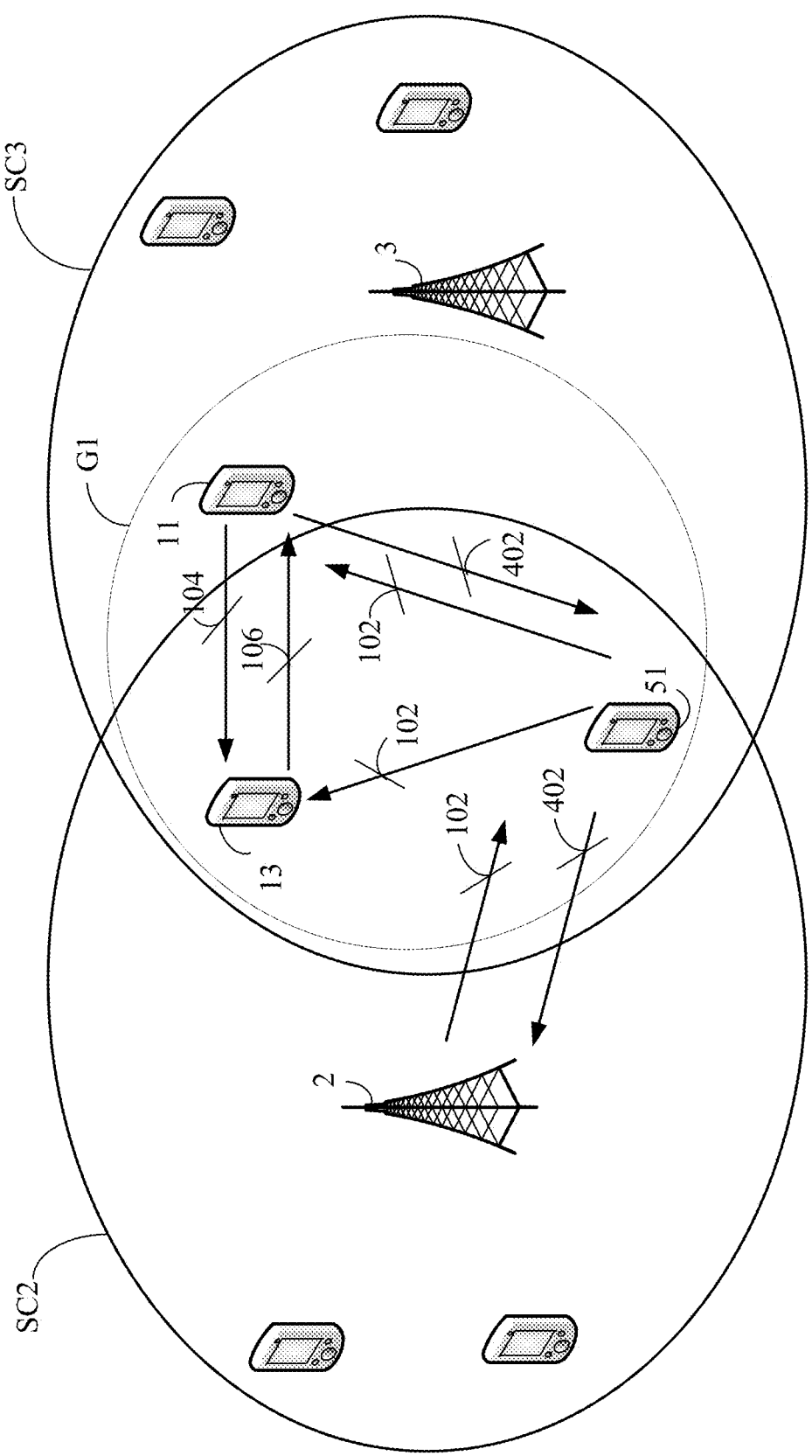
FIG. 14 depicts a scenario according to another embodiment of the present invention.

Similarly, in this embodiment, the base station 2 and the base station 3 also perform a negotiation procedure and generate the D2D hybrid access map according to the resource request received from the D2D UE; and then, the base station 2 and the base station 3 transmit the wireless signal 102 and the wireless signal 1102 to the UEs located in their respective coverages through broadcasting respectively. However, in other embodiments, the base station 2 or the base station 3 may transmit the wireless signal to the coordinator of each of the D2D groups through multicasting. For example, as shown in FIG. 14, the D2D UE 51 relays the wireless signal 102 to the first D2D UE 11 and the second D2D UE 13 after receiving the wireless signal 102 from the base station 2.

Figure 15A:
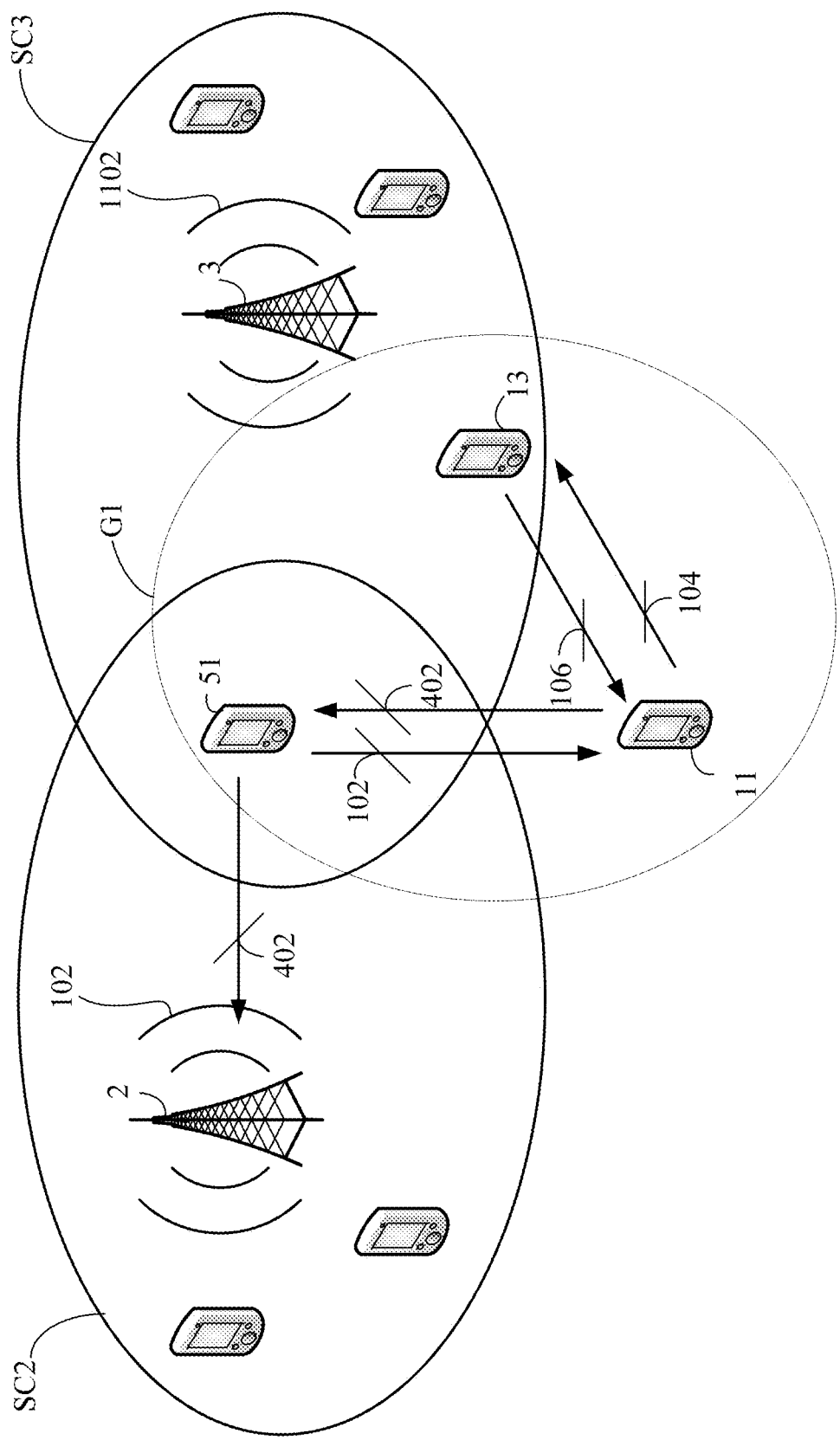
FIGS. 15A-15B depict a scenario according to an eleventh embodiment of the present invention.
Figure 15B:
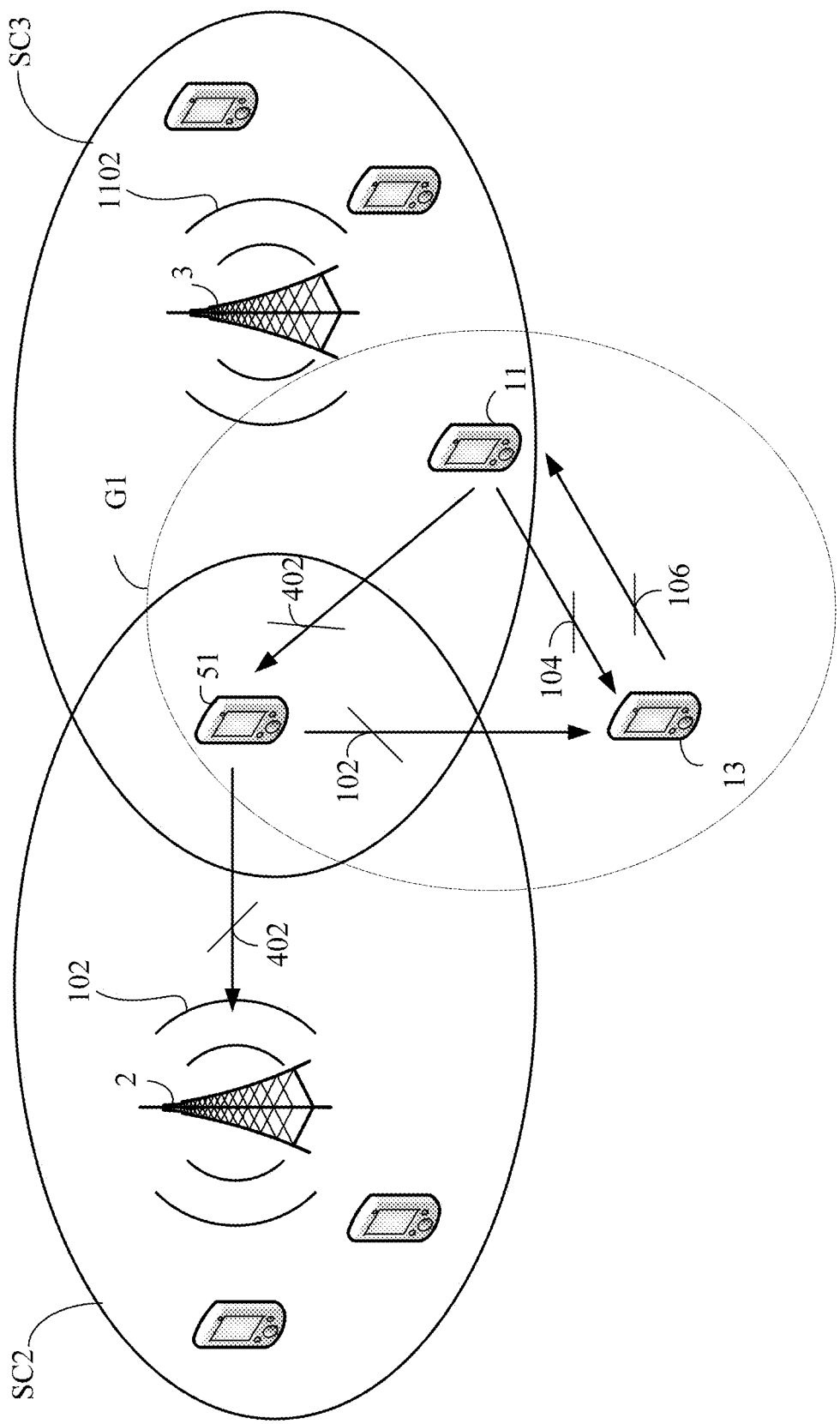

An eleventh embodiment of the present invention is shown in FIG. 15A and FIG. 15B. In this embodiment, the coordinator in the D2D group is located in the signal coverage SC2 of the base station 2 and the signal coverage SC3 of the base station 3 at the same time, but there is a D2D UE located out of the signal coverage of the base station 2 and the signal coverage of the base station 3 at the same time in the D2D group. Accordingly, the coordinator in the D2D group needs to relay the wireless signal transmitted by the base station to the D2D UE located out of the signal coverage, and relay the resource request transmitted by the D2D UE located out of the signal coverage to the base station.

For example, as shown in FIG. 15A, the first D2D UE 11 is located out of the signal coverage, so when it is to perform information transmission with the second D2D UE 13, it needs to transmit the resource request 402 to the D2D UE 51. Then, the D2D UE 51 relays the resource request 402 to the base station 2. Similarly, the base station 2 and the base station 3 perform a negotiation procedure to generate the frequency negotiation information, and then load the frequency negotiation information into the hybrid access channels of the wireless signal 102 and the wireless signal 1102 respectively. Then, the base station 2 and the base station 3 transmit the wireless signal 102 and the wireless signal 1102 to the D2D UEs located in their respective signal coverage through broadcasting respectively. Then, the D2D UE 51 further relays the wireless signal 102 to the first D2D UE 11 so that the first D2D UE 11 can perform the D2D data transmission with the second D2D UE 13 according to the D2D hybrid access map.

As another example, as shown in FIG. 15B, the second D2D UE 13 is located out of the signal coverage. In this case, the D2D UE 51 relays the wireless signal 102 to the second D2D UE 13, and the first D2D UE 11 may receive the wireless signal 1102 from the base station 3 so as to retrieve the D2D hybrid access map from the wireless signal 1102 and to know the D2D resource blocks.

Figure 16A:
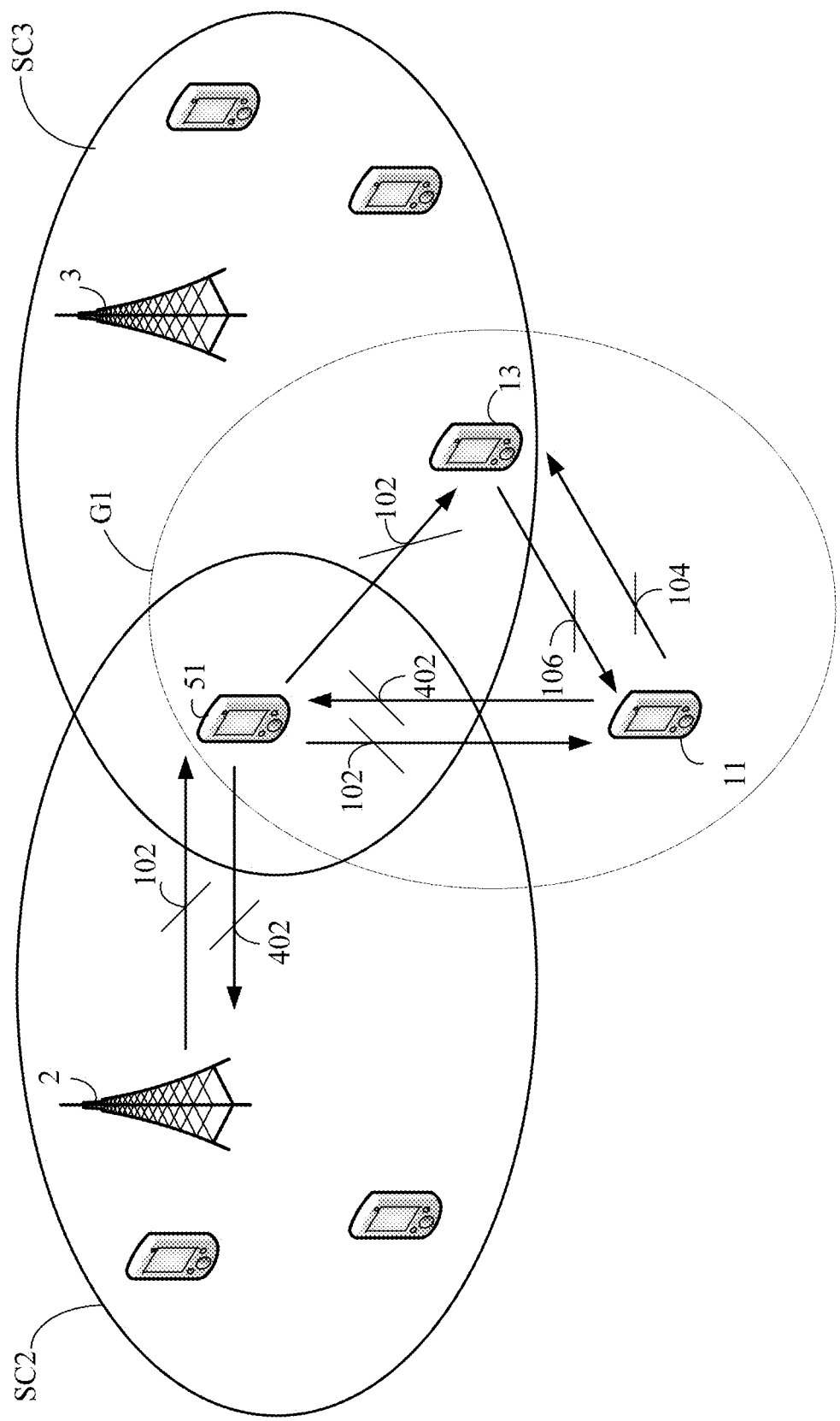
FIGS. 16A-16B depict a scenario according to a twelfth embodiment of the present invention.
Figure 16B:
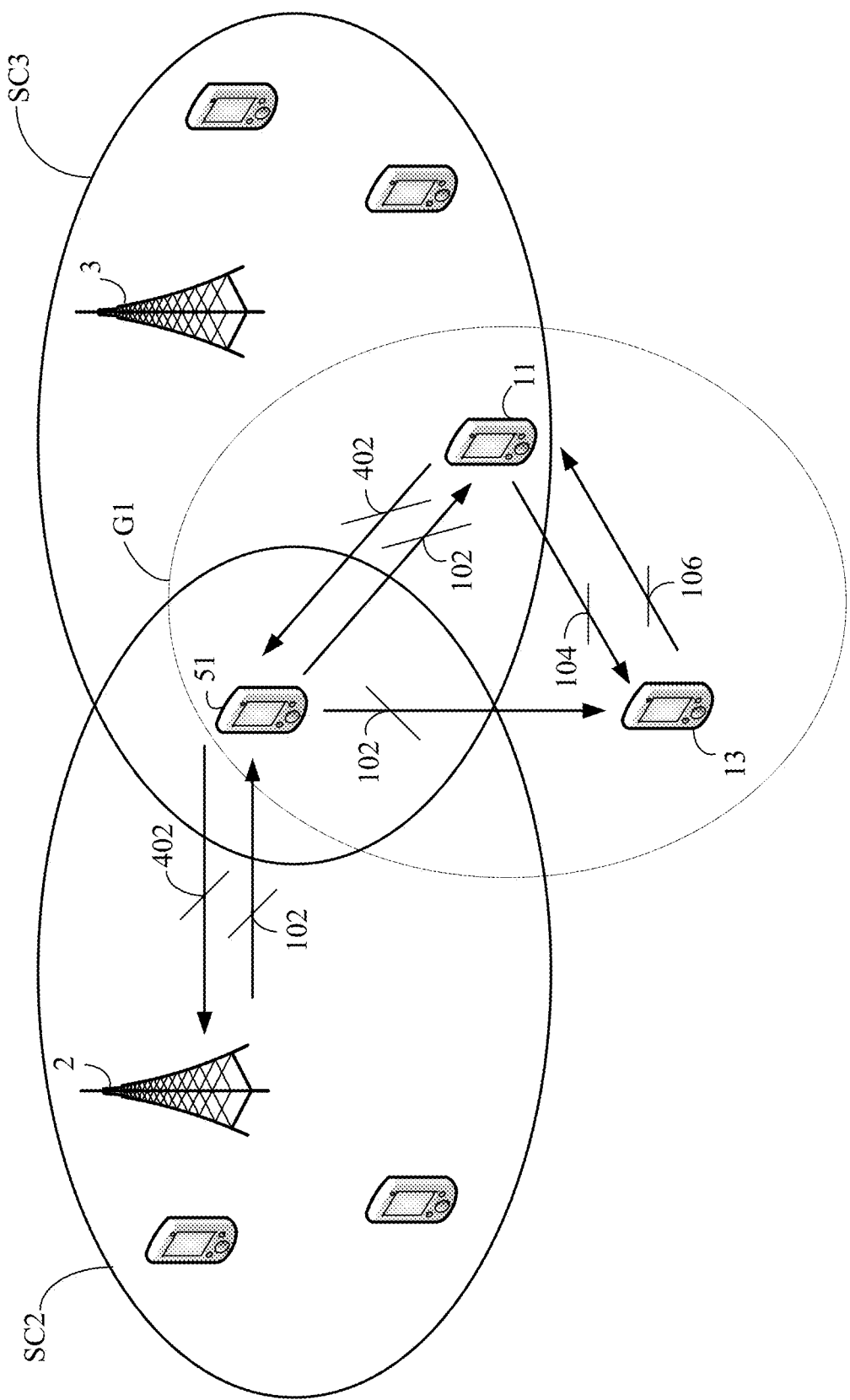

A twelfth embodiment of the present invention is shown in FIG. 16A and FIG. 16B. This embodiment differs from the eleventh embodiment in that, the base station 2 and the base station 3 transmit the wireless signal 102 and the wireless signal 1102 through multicasting, so the D2D UE 51 further needs to relay the wireless signal 102 to the first D2D UE 11 and the second D2D UE 13.

According to the above descriptions, the base station of the present invention can choose the resource blocks necessary for each of D2D UEs or each of the D2D groups to perform the D2D data transmission from the radio resources of the current 3GPP LTE network, and notifies the D2D UEs of the resource blocks by creating and transmitting the D2D hybrid access map. Additionally, the D2D transmission mechanism of the present invention can allow a D2D UE located in the signal coverage of the base station to perform the D2D data transmission with a D2D UE located out of the signal coverage of the base station. Furthermore, the D2D transmission mechanism of the present invention may also allow D2D UEs located in signal coverages of different base stations to perform the D2D data transmission therebetween. Thereby, the transmission mechanism of the present invention can modify the current 3GPP LTE network to extend its application to the public safety network so that the D2D UEs can directly communicate with each other without affecting the signal transmission of the original 3GPP LTE network.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device to device (D2D) user equipment, comprising:
a transceiver, being configured to receive a wireless signal, wherein the wireless signal has a hybrid access channel carrying a D2D hybrid access map, and the D2D hybrid access map is generated by a base station; and
a processor electrically connected to the transceiver, being configured to retrieve the D2D hybrid access map from the hybrid access channel;
wherein the D2D hybrid access map indicates a D2D resource block, a first D2D user equipment transmits a D2D hybrid access request to a second D2D user equipment via the D2D resource block, the second D2D user equipment transmits a D2D hybrid access response to the first D2D user equipment via the D2D resource block after receiving the D2D hybrid access request, and then the first D2D user equipment and the second D2D user equipment perform a D2D data transmission via a plurality of sub-resource blocks in the D2D resource block indicated by a piece of D2D data transmission information carried in the D2D hybrid access response.

2. The D2D user equipment as claimed in claim 1, wherein the transceiver receives the wireless signal from the base station.

3. The D2D user equipment as claimed in claim 1, wherein the D2D user equipment is the first D2D user equipment, the processor further generates the D2D hybrid access request, and the transceiver further transmits the D2D hybrid access request and receives the D2D hybrid access response.

4. The D2D user equipment as claimed in claim 1, wherein the D2D user equipment is the second D2D user equipment, the processor further generates the D2D hybrid access response, and the transceiver further receives the D2D hybrid access request and transmits the D2D hybrid access response.

5. The D2D user equipment as claimed in claim 1, wherein the hybrid access channel of the wireless signal further carries a piece of frequency negotiation information, and the frequency negotiation information is generated by the base station.

6. The D2D user equipment as claimed in claim 1, wherein, based on the D2D hybrid access map, the first D2D user equipment further transmits another D2D hybrid access request to a third D2D user equipment via the D2D resource block, the third D2D user equipment transmits another D2D hybrid access response to the first D2D user equipment via the D2D resource block after receiving the another D2D hybrid access request, and then the first D2D user equipment and the third D2D user equipment perform another D2D data transmission according to another piece of D2D data transmission information carried in the another D2D hybrid access response.

7. The D2D user equipment as claimed in claim 1, wherein, based on the D2D hybrid access map, the second D2D user equipment transmits another D2D hybrid access request to a third D2D user equipment via the D2D resource block, the third D2D user equipment transmits another D2D hybrid access response to the second D2D user equipment via the D2D resource block after receiving the another D2D hybrid access request, and then the second D2D user equipment and the third D2D user equipment perform another D2D data transmission according to another piece of D2D data transmission information carried in the another D2D hybrid access response.

8. The D2D user equipment as claimed in claim 1, wherein a third D2D user equipment transmits another D2D hybrid access request to a fourth D2D user equipment via the hybrid access channel, the fourth D2D user equipment transmits another D2D hybrid access response to the third user equipment via the hybrid access channel after receiving the another D2D hybrid access request, and then the third D2D user equipment and the fourth D2D user equipment perform another D2D data transmission according to another piece of D2D data transmission information carried in the another D2D hybrid access response.

9. The D2D user equipment as claimed in claim 2, wherein the transceiver further relays the wireless signal to another D2D user equipment.

10. The D2D user equipment as claimed in claim 2, wherein the processor further generates a resource request and the transceiver further transmits the resource request to the base station.

11. The D2D user equipment as claimed in claim 2, wherein the transceiver further receives a resource request from the first D2D user equipment and then relays the resource request to the base station.

12. The D2D user equipment as claimed in claim 3, wherein the D2D user equipment receives the wireless signal from the base station or another D2D user equipment.

13. The D2D user equipment as claimed in claim 3, wherein the processor further generates a resource request and the transceiver further transmits the resource request to one of the base station and the another D2D user equipment.

14. The D2D user equipment as claimed in claim 4, wherein the D2D user equipment receives the wireless signal from the base station or another D2D user equipment.

15. The D2D user equipment as claimed in claim 4, wherein the processor adjusts a transmission power of the D2D hybrid access response according to a received signal strength of the D2D hybrid access request.

16. The D2D user equipment as claimed in claim 4, wherein the processor generates a power control message according to the received signal strength of the D2D hybrid access request and loads the power control message into the D2D hybrid access response so that the first D2D user equipment adjusts a data transmission power according to the power control message.

17. The D2D user equipment as claimed in claimed 9, wherein the another D2D user equipment is one of the first D2D user equipment and the second D2D user equipment.

18. A base station, comprising:
   a processor, being configured to generate a wireless signal, wherein the wireless signal has a hybrid access channel carrying a D2D hybrid access map;
   a transceiver electrically connected to the processor, being configured to transmit the wireless signal to at least one D2D user equipment;
   wherein the D2D hybrid access map indicates a D2D resource block; a first D2D user equipment transmits a D2D hybrid access request to a second D2D user equipment via the D2D resource block, the second D2D user equipment transmits a D2D hybrid access response to the first D2D user equipment via the D2D resource block after receiving the D2D hybrid access request, and then the first D2D user equipment and the second D2D user equipment perform a D2D data transmission via a plurality of sub-resource blocks in the D2D resource block indicated by a piece of D2D data transmission information carried in the D2D hybrid access response.

19. The base station as claimed in claim 18, wherein the transceiver further receives a resource request from the at least one D2D user equipment, and the processor generates the D2D hybrid access map according to the resource request.

20. The base station as claimed in claim 18, wherein the processor further generates a piece of frequency negotiation information according to a negotiation procedure between the base station and another base station, and then loads the frequency negotiation information into the hybrid access channel of the wireless signal.

21. The base station as claimed in claim 18, wherein the processor generates the D2D hybrid access map according to a default resource request.

22. The base station as claimed in claim 18, wherein the transceiver transmits the wireless signal to the at least one D2D user equipment in one of a broadcast manner and a multicast manner.

* * * * *